United States Patent
Kubota et al.

(10) Patent No.: US 11,630,329 B2
(45) Date of Patent: Apr. 18, 2023

(54) ELECTRONIC CASE FOR ELECTRONIC SPECTACLES

(71) Applicant: ACUCELA INC., Seattle, WA (US)

(72) Inventors: Ryo Kubota, Seattle, WA (US); Philip M. Buscemi, Mount Pleasant, SC (US); Pascal Loser, Liebefeld (CH); Ben Crook, Bremgarten bei Bern (CH); Massimo Pinazza, Domegge di Cadore (IT); Jim Niebanck, Seattle, WA (US); James Phillips, Roanoke, VA (US); Stefan Bauer, Bern (CH)

(73) Assignee: ACUCELA INC., Seattle, WA (US)

( * ) Notice: Subject to any disclaimer, the term of this patent is extended or adjusted under 35 U.S.C. 154(b) by 0 days.

(21) Appl. No.: 17/820,493

(22) Filed: Aug. 17, 2022

(65) Prior Publication Data
US 2022/0390766 A1    Dec. 8, 2022

Related U.S. Application Data

(63) Continuation of application No. 17/662,805, filed on May 10, 2022, now Pat. No. 11,460,720, which is a continuation of application No. 17/302,479, filed on May 4, 2021, now Pat. No. 11,366,341.

(51) Int. Cl.
*G02C 11/00*    (2006.01)
*G02C 7/08*    (2006.01)
*G02C 5/14*    (2006.01)

(52) U.S. Cl.
CPC ............. *G02C 7/083* (2013.01); *G02C 5/146* (2013.01); *G02C 11/10* (2013.01); *G02C 2200/08* (2013.01)

(58) Field of Classification Search
CPC ...... G02C 7/083; G02C 2200/08; G02C 5/14; G02C 5/146; G02C 11/00; G02C 11/10
(Continued)

(56) References Cited

U.S. PATENT DOCUMENTS 6,516,808 B2    2/2003    Schulman
7,018,040 B2    3/2006    Blum
(Continued)

FOREIGN PATENT DOCUMENTS

EP    3153139    4/2017
EP    3413116    12/2018
(Continued)

OTHER PUBLICATIONS

Adler, Daniel, et al., "The possible effect of under correction on myopic progression in children," Clin Exp Optom., 89:315-321 (2006).
(Continued)

*Primary Examiner* — William R Alexander
(74) *Attorney, Agent, or Firm* — FisherBroyles LLP; John Shimmick

(57) ABSTRACT

An electronic case for electronic spectacles may include a base comprising a cavity formed therein. A first spectacle retention device may be located within the cavity. The first spectacle retention device may be configured to retain spectacles. An electrical control system may be included. An electrical connector may be configured to couple the electrical control system in electronic communication with the spectacles.

9 Claims, 11 Drawing Sheets

(58) Field of Classification Search
USPC .................................................. 351/159.39
See application file for complete search history.

(56) References Cited

U.S. PATENT DOCUMENTS

| | | |
|---|---|---|
| 8,246,167 B2 | 8/2012 | Legerton |
| 8,432,124 B2 | 4/2013 | Foster |
| 8,662,664 B2 | 3/2014 | Artal Soriano |
| 8,857,983 B2 | 10/2014 | Pugh |
| 9,345,813 B2 | 5/2016 | Hogg |
| 9,482,882 B1 | 11/2016 | Hanover |
| 9,482,883 B1 | 11/2016 | Meisenholder |
| 9,726,904 B1 | 8/2017 | Lin |
| 9,763,827 B2 | 9/2017 | Kelleher |
| 9,885,884 B2 | 2/2018 | Drobe |
| 9,918,894 B2 | 3/2018 | Lam |
| RE47,006 E | 8/2018 | To |
| 10,133,092 B2 | 11/2018 | Tsubota |
| 10,139,521 B2 | 11/2018 | Tran |
| 10,146,067 B2 | 12/2018 | Tsai |
| 10,231,897 B2 | 3/2019 | Tse |
| 10,268,050 B2 | 4/2019 | To |
| 10,288,909 B1 | 5/2019 | Youssef |
| 10,591,745 B1 | 3/2020 | Lin |
| 10,788,686 B2 | 9/2020 | Tsai |
| 10,884,264 B2 | 1/2021 | Hones |
| 10,921,612 B2 | 2/2021 | Zhou |
| 10,993,515 B1 | 5/2021 | Kim |
| 11,000,186 B2 | 5/2021 | Linder |
| 11,163,166 B1 | 11/2021 | Ebert |
| 11,187,921 B2 | 11/2021 | Zhou |
| 11,219,287 B1 | 1/2022 | Kim |
| 11,281,022 B2 | 3/2022 | Buscemi |
| 11,320,674 B2 | 5/2022 | Kubota |
| 11,358,001 B2 | 6/2022 | Kubota |
| 11,366,339 B2 | 6/2022 | Kubota |
| 11,366,341 B1 | 6/2022 | Kubota |
| 11,402,662 B2 | 8/2022 | Wyss |
| 11,409,136 B1 | 8/2022 | Kubota |
| 11,415,818 B2 * | 8/2022 | Olgun ................. H04B 1/385 |
| 11,444,488 B2 * | 9/2022 | Bohn ................... H02J 50/10 |
| 11,460,720 B1 | 10/2022 | Kubota |
| 11,467,423 B2 | 10/2022 | Buscemi |
| 11,467,426 B2 | 10/2022 | Kubota |
| 11,467,428 B2 | 10/2022 | Kubota |
| 11,480,813 B2 | 10/2022 | Kubota |
| 2002/0186345 A1 | 12/2002 | Duppstadt |
| 2003/0011745 A1 | 1/2003 | Molebny |
| 2004/0237971 A1 | 12/2004 | Radhakrishnan |
| 2004/0246441 A1 | 12/2004 | Stark |
| 2004/0257529 A1 | 12/2004 | Thomas |
| 2005/0258053 A1 | 11/2005 | Sieg |
| 2006/0082729 A1 | 4/2006 | To |
| 2007/0002452 A1 | 1/2007 | Munro |
| 2007/0076217 A1 | 4/2007 | Baker |
| 2007/0115431 A1 | 5/2007 | Smith, III |
| 2007/0127349 A1 | 6/2007 | Hotta |
| 2007/0281752 A1 | 12/2007 | Lewis |
| 2008/0291391 A1 | 11/2008 | Meyers |
| 2008/0309882 A1 | 12/2008 | Thorn |
| 2009/0002631 A1 | 1/2009 | Campbell |
| 2009/0187242 A1 | 7/2009 | Weeber |
| 2009/0201460 A1 | 8/2009 | Blum |
| 2009/0204207 A1 | 8/2009 | Blum |
| 2010/0076417 A1 | 3/2010 | Suckewer |
| 2010/0294675 A1 | 11/2010 | Mangano |
| 2010/0296058 A1 | 11/2010 | Ho |
| 2011/0085129 A1 | 4/2011 | Legerton |
| 2011/0153012 A1 | 6/2011 | Legerton |
| 2011/0157554 A1 | 6/2011 | Kawai |
| 2011/0202114 A1 | 8/2011 | Kessel |
| 2012/0055817 A1 | 3/2012 | Newman |
| 2012/0062836 A1 | 3/2012 | Tse |
| 2012/0199995 A1 | 8/2012 | Pugh |
| 2012/0206485 A1 | 8/2012 | Osterhout |
| 2012/0212399 A1 | 8/2012 | Border |
| 2012/0215291 A1 | 8/2012 | Pugh |
| 2013/0027655 A1 | 1/2013 | Blum |
| 2013/0072828 A1 | 3/2013 | Sweis |
| 2013/0194540 A1 | 8/2013 | Pugh |
| 2013/0278887 A1 | 10/2013 | Legerton |
| 2014/0039048 A1 | 2/2014 | Olof |
| 2014/0039361 A1 | 2/2014 | Siu |
| 2014/0194773 A1 | 7/2014 | Pletcher |
| 2014/0218647 A1 | 8/2014 | Blum |
| 2014/0240665 A1 | 8/2014 | Pugh |
| 2014/0268029 A1 | 9/2014 | Pugh |
| 2014/0277291 A1 | 9/2014 | Pugh |
| 2014/0379054 A1 | 12/2014 | Cooper |
| 2015/0057701 A1 | 2/2015 | Kelleher |
| 2015/0109574 A1 | 4/2015 | Tse |
| 2015/0160477 A1 | 6/2015 | Dai |
| 2015/0200554 A1 | 7/2015 | Marks |
| 2015/0241706 A1 | 8/2015 | Schowengerdt |
| 2016/0056498 A1 | 2/2016 | Flitsch |
| 2016/0067037 A1 | 3/2016 | Rosen |
| 2016/0067087 A1 | 3/2016 | Tedford |
| 2016/0091737 A1 | 3/2016 | Kim |
| 2016/0143801 A1 | 5/2016 | Lam |
| 2016/0158486 A1 | 6/2016 | Colbaugh |
| 2016/0212404 A1 | 7/2016 | Maiello |
| 2016/0270656 A1 | 9/2016 | Samec |
| 2016/0377884 A1 | 12/2016 | Lau |
| 2017/0000326 A1 | 1/2017 | Samec |
| 2017/0001032 A1 | 1/2017 | Samec |
| 2017/0010480 A1 | 1/2017 | Blum |
| 2017/0014074 A1 | 1/2017 | Etzkorn |
| 2017/0055823 A1 | 3/2017 | Lu |
| 2017/0072218 A1 | 3/2017 | Rucker |
| 2017/0078623 A1 | 3/2017 | Hilkes |
| 2017/0097519 A1 | 4/2017 | Lee |
| 2017/0184875 A1 | 6/2017 | Newman |
| 2017/0229730 A1 | 8/2017 | Flitsch |
| 2017/0236255 A1 | 8/2017 | Wetzstein |
| 2017/0270636 A1 | 9/2017 | Shtukater |
| 2017/0276963 A1 | 9/2017 | Brennan |
| 2017/0307779 A1 | 10/2017 | Marullo |
| 2018/0017810 A1 | 1/2018 | Wu |
| 2018/0017814 A1 | 1/2018 | Tuan |
| 2018/0052319 A1 | 2/2018 | McCabe |
| 2018/0055351 A1 | 3/2018 | Yates |
| 2018/0074322 A1 | 3/2018 | Rousseau |
| 2018/0090958 A1 | 3/2018 | Steger |
| 2018/0092738 A1 | 4/2018 | Tai |
| 2018/0136486 A1 | 5/2018 | MacNamara |
| 2018/0136491 A1 | 5/2018 | Ashwood |
| 2018/0161231 A1 | 6/2018 | Tse |
| 2018/0173010 A1 | 6/2018 | Harant |
| 2018/0188556 A1 | 7/2018 | Portney |
| 2018/0221140 A1 | 8/2018 | Rosen |
| 2018/0264284 A1 | 9/2018 | Alvarez |
| 2018/0275427 A1 | 9/2018 | Lau |
| 2018/0345034 A1 | 12/2018 | Butzloff |
| 2019/0033618 A1 | 1/2019 | Choi |
| 2019/0033619 A1 | 1/2019 | Neitz |
| 2019/0038123 A1 | 2/2019 | Linder |
| 2019/0049730 A1 | 2/2019 | Miller |
| 2019/0076241 A1 | 3/2019 | Alarcon Heredia |
| 2019/0092545 A1 | 3/2019 | Oag |
| 2019/0107734 A1 | 4/2019 | Lee |
| 2019/0113757 A1 | 4/2019 | Van Heugten |
| 2019/0129204 A1 | 5/2019 | Tsubota |
| 2019/0227342 A1 | 7/2019 | Brennan |
| 2019/0235279 A1 | 8/2019 | Hones |
| 2019/0247675 A1 | 8/2019 | Legerton |
| 2019/0250432 A1 | 8/2019 | Kim |
| 2019/0314147 A1 | 10/2019 | Blum |
| 2020/0033637 A1 | 1/2020 | Jamshidi |
| 2020/0073148 A1 | 3/2020 | Alhaideri |
| 2020/0089023 A1 | 3/2020 | Zhou |
| 2020/0110265 A1 | 4/2020 | Serdarevic |
| 2020/0133024 A1 | 4/2020 | Paune Fabre |
| 2020/0142219 A1 | 5/2020 | Rousseau |
| 2020/0183169 A1 | 6/2020 | Peng |

(56) References Cited

U.S. PATENT DOCUMENTS

| | | | |
|---|---|---|---|
| 2020/0264455 A1* | 8/2020 | Olgun | H04B 1/385 |
| 2020/0360184 A1 | 11/2020 | Xiao | |
| 2021/0018762 A1 | 1/2021 | Zheleznyak | |
| 2021/0031051 A1 | 2/2021 | Kubota | |
| 2021/0048690 A1 | 2/2021 | Guillot | |
| 2021/0069524 A1 | 3/2021 | Kubota | |
| 2021/0231977 A1 | 7/2021 | Zhou | |
| 2021/0263336 A1 | 8/2021 | Gupta | |
| 2021/0298440 A1 | 9/2021 | Kim | |
| 2021/0329764 A1 | 10/2021 | Linder | |
| 2021/0356767 A1 | 11/2021 | Kubota | |
| 2021/0376661 A1* | 12/2021 | Bohn | H02J 50/005 |
| 2021/0379399 A1 | 12/2021 | Buscemi | |
| 2021/0382325 A1 | 12/2021 | Kubota | |
| 2021/0382326 A1 | 12/2021 | Kubota | |
| 2021/0389607 A1 | 12/2021 | Buscemi | |
| 2022/0179213 A1* | 6/2022 | Zhou | H02J 50/90 |
| 2022/0231523 A1* | 7/2022 | Bristol | H02J 7/0044 |

FOREIGN PATENT DOCUMENTS

| | | |
|---|---|---|
| KR | 20180038359 A | 4/2018 |
| WO | 2009074638 A3 | 6/2009 |
| WO | 2009121810 | 10/2009 |
| WO | 2010015255 A1 | 2/2010 |
| WO | 2010043599 | 4/2010 |
| WO | 2011089042 | 7/2011 |
| WO | 2012136470 | 10/2012 |
| WO | 2013087518 | 6/2013 |
| WO | 2013158418 | 10/2013 |
| WO | 2014033035 | 3/2014 |
| WO | 2014191460 | 12/2014 |
| WO | 2015063097 | 5/2015 |
| WO | 2015186723 | 12/2015 |
| WO | 2015192117 | 12/2015 |
| WO | 2017094886 | 6/2017 |
| WO | 2017097708 | 6/2017 |
| WO | 2018014712 | 1/2018 |
| WO | 2018014960 | 1/2018 |
| WO | 2018085576 | 5/2018 |
| WO | 2018088980 | 5/2018 |
| WO | 2018208724 | 11/2018 |
| WO | 2019114463 | 6/2019 |
| WO | 2019191510 | 10/2019 |
| WO | 2019217241 | 11/2019 |
| WO | 2020014074 | 1/2020 |
| WO | 2020014613 | 1/2020 |
| WO | 2020028177 | 2/2020 |
| WO | 2020069232 | 4/2020 |
| WO | 2021022193 | 2/2021 |
| WO | 2021056018 | 3/2021 |
| WO | 2021168481 | 8/2021 |
| WO | 2021231684 | 11/2021 |
| WO | 2021252318 | 12/2021 |
| WO | 2021252319 | 12/2021 |
| WO | 2021252320 | 12/2021 |
| WO | 2022217193 | 10/2022 |

OTHER PUBLICATIONS

Aleman, Andrea C., et al.,, "Reading and Myopia: Contrast Polarity Matters," Scientific Reports, 8 pages (2018).
Arden, G.B., et al., "Does dark adaptation exacerbate diabetic retinopathy? Evidence and a linking hypothesis," Vision Research 38:1723-1729 (1998).
Arden, GB, et al, "Regression of early diabetic macular edema is associated with prevention of dark adaptation", in Eye, (2011). 25, pp. 1546-1554.
Benavente-Perez, A., et al., "Axial Eye Growth and Refractive Error Development Can Be Modified by Exposing the Peripheral Retina to Relative Myopic or Hyperopic Defocus," Invest Ophthalmol Vis Sci., 55:6765-6773 (2014).
Bonar, JR, et al., "High brightness low power consumption microLED arrays", in SPIE DigitalLibrary.org/conference-proceedings-of-spie, SPIE OPTO, 2016, San Francisco, California, United States, Abstract Only.
Carr, Brittany J., et al., "The Science Behind Myopia," retrieved from https://webvision.med.utah.edu/book/part-xvii-refractive-errors/the-science-behind-myopia-by-brittany-j-carr-and-william-k-stell/, 89 pages (2018).
Chakraborty, R., et al., "Diurnal Variations in Axial Length, Choroidal Thickness, Intraocular Pressure, and Ocular Biometrics," IOVS, 52(8):5121-5129 (2011).
Chakraborty, R., et al., "Hyperopic Defocus and Diurnal Changes in Human Choroid and Axial Length," Optometry and Visual Science, 90(11):1187-1198 (2013).
Chakraborty, R., et al., "Monocular Myopic Defocus and Daily Changes in Axial Length and Choroidal Thickness of human Eyes," Exp Eye Res, 103:47-54 (2012).
Cook, Colin A., et al., "Phototherapeutic Contact Lens for Diabetic Retinopahty," 2018 IEEE Micro Electro Mechanical Systems, pp. 62-65, XP033335512, (Jan. 21, 2018).
Cooper, J., et al, "Current status of the development and treatment of myopia", Optometry, 83:179-199 (2012).
Cooper, J., et al., "A Review of Current Concepts of the Etiology and Treatment of Myopia," Eye & Contact Lens, 44(4):231-247 (Jul. 2018).
Demory, B., et al, "Integrated parabolic microlenses on micro LED color pixels", in Nanotechnology, (2018); 29, 16, pp. 1018, Abstract Only.
Dolgin, Elie, "The Myopia Boom," Nature 519:276-278 (2015).
Edrington, Timothy B., "A literature review: The impact of rotational stabilization methods on toric soft contact lens performance," Contact Lens & Anterior Eye, 34:104-110 (2011).
Flitcroft, D.I., "The complex interactions of retinal, optical and environmental factors in myopia aetiology," 31(6):622-660 (2012).
Garner, L.F., et al., "Crystalline Lens Power in Myopia," Optometry and Vision Science, 69:863-865 (1992).
Gwiazda, Jane, "Treatment Options for Myopia," retrieved from https://www.ncbi.nlm.nih.gov/pmc/articles/PMC2729053/, Optom Vis Sci., 86(6):624-628 (Jun. 2009).
Gwiazda, Jane, et al, "A Randomized Clinical Trial of Progressive Addition Lenses versus Single Vision Lenses on the Progression of Myopia in Children", Invest Ophthalmol Vis Sci, 44:1492-500 [PubMed: 12657584] (2003).
Haglund, Erik, et al., "Multi-wavelength VCSEL arrays using high-contrast gratings," Proc. of SPIE vol. 10113, 7 pages (2017).
Hammond, D.S., et al, "Dynamics of active emmetropisation in young chicks—influence of sign and magnitude of imposed defocus" Ophthalmic Physiol Opt. 33:215-222 (2013).
Henry W., "MicroLED Sources enable diverse ultra-low power applications", in Photonic Spectra, 2013.
International Search Report and Wrriten Opinion for PCT/US2022/072034, 14 pages (dated Oct. 4, 2022).
Jayaraman, V., et al., "Recent Advances in MEMS-VCSELs for High Performance Structural and Functional SS-OCT Imaging," Proc. of SPIE vol. 8934, retrieved from http://proceedings.spiedigitallibrary.org/ on Dec. 1, 2015 (2014).
Jones, D., "Measure Axial Length to Guide Myopia Management," Review of Myopia Management, 5 pages (Apr. 9, 2020).
Kur, Joanna, et al., "Light adaptation does not prevent early retinal abnormalities in diabetic rats," Scientific Reports, 8 pages (Feb. 8, 2016).
Lagreze, Wolf A., et al., "Preventing Myopia," retrieved from https://www.ncbi.nlm.nih.gov/pmc/articles/PMC5615392/, Dtsch Arztebl Int., 114(35-36):575-580 (Sep. 2017).
Lam, Carly Siu Yin, et al., "Defocus Incorporated Multiple Segments (DIMS) spectacle lenses slow myopia progression: a 2-year randomised clinical trial," Br. J. Ophthalmol. 0:1-6 (2019).
Leo, Seo-Wei, et al., "An evidence-based update on myopia and interventions to retard its progression," J AAPOS, 15(2):181-189 (Apr. 2011).
Lingley, A.R., et al, : A single pixel wireless contact lens display, in J Micromech. Microeng., 2011; 21, 125014; doi:10.1088/0960-1317/21/12/125014, Abstract Only.

(56) References Cited

OTHER PUBLICATIONS

Martin, J.A., et al., "Predicting and Assessing Visual Performance with Multizone Bifocal Contact Lenses," Optom Vis Sci, 80(12):812-819 (2003).

Matkovic, K., et al., "Global Contrast Factor—a New Approach to Image Contrast," Computational Aesthetics in Graphics, Visualization and Imaging, 9 pages (2005).

McKeague C, et al. "Low-level night-time light therapy for age-related macular degeneration (ALight): study protocol for a randomized controlled trial", in Trials 2014, 15:246, http://www.trialsjournal.com/content/15/1/246.

Moreno, I, "Creating a desired lighting pattern with an LED array" in Aug. 2008, Proceedings of SPIE—The International Society for Optical Engineering 7058, DOI: 10.1117/12.795673.

Moreno, I., "Modeling the radiation pattern of LEDS", in Optics Express, 2008; 16, 3 pp. 1808.

Nickla, Debora L., et al., "Brief hyperopic defocus or form deprivation have varying effects on eye growth and ocular rhythms depending on the time-of-day of exposure," Exp Eye Res. 161:132-142 (Aug. 2017).

Ramsey, DJ, and Arden, GB, "Hypoxia and dark adaptation in diabetic retinopathy: Interactions, consequences and therapy", in Microvascular Complications—Retinopathy (JK Sun, ed.), Cur Dab Rep (2015) 15: 118, DOI 10.1007/s11892-015-0686-2, Abstract Only.

Read, Scott A., et al., "Choroidal changes in human myopia: insights from optical coherence tomography imaging," Clin Exp Optom, 16 pages (2018).

Read, Scott A., et al., "Human Optical Axial Length and Defocus," IOVS, 51(12):6262-6269 (2010).

Shivaprasad, S, et al, "Clinical efficacy and safety of a light mask for prevention of dark adaptation in treating and preventing progression of early diabetic macular oedema at 24 months (CLEOPATRA): a multicentre, phase 3, randomised controlled trial," in www.thelancet.com/diabetes-endocrinology vol. 6, pp. 382-391 ( May 2018).

Smith, III, Earl L., "Optical treatment strategies to slow myopia progression: Effects of the visual extent of the optical treatment zone," retrieved from https://www.ncbi.nlm.nih.gov/pmc/articles/PMC3624048/, Exp Eye Res., 114:77-88 (Sep. 2013).

Srinivasan, S., "Ocular axes and angles: Time for better understanding," J. Cataract Refract. Surg., 42:351-352 (Mar. 2016).

Torii, Hidemasa, et al., "Violet Light Exposure Can Be a Preventive Strategy Against Myopia Progression," EBioMedicine 15:210-219 (2017).

Wallman, Josh, et al., "Homeostasis of Eye Growth and the Question of Myopia," Neuron, 43:447-468 (2004).

Wolffsohn, James A., et al., "Impact of Soft Contact Lens Edge Design and Midperipheral Lens Shape on the Epithelium and Its Indentation With Lens Mobility," IOVS, 54(9):6190-6196 (2013).

* cited by examiner

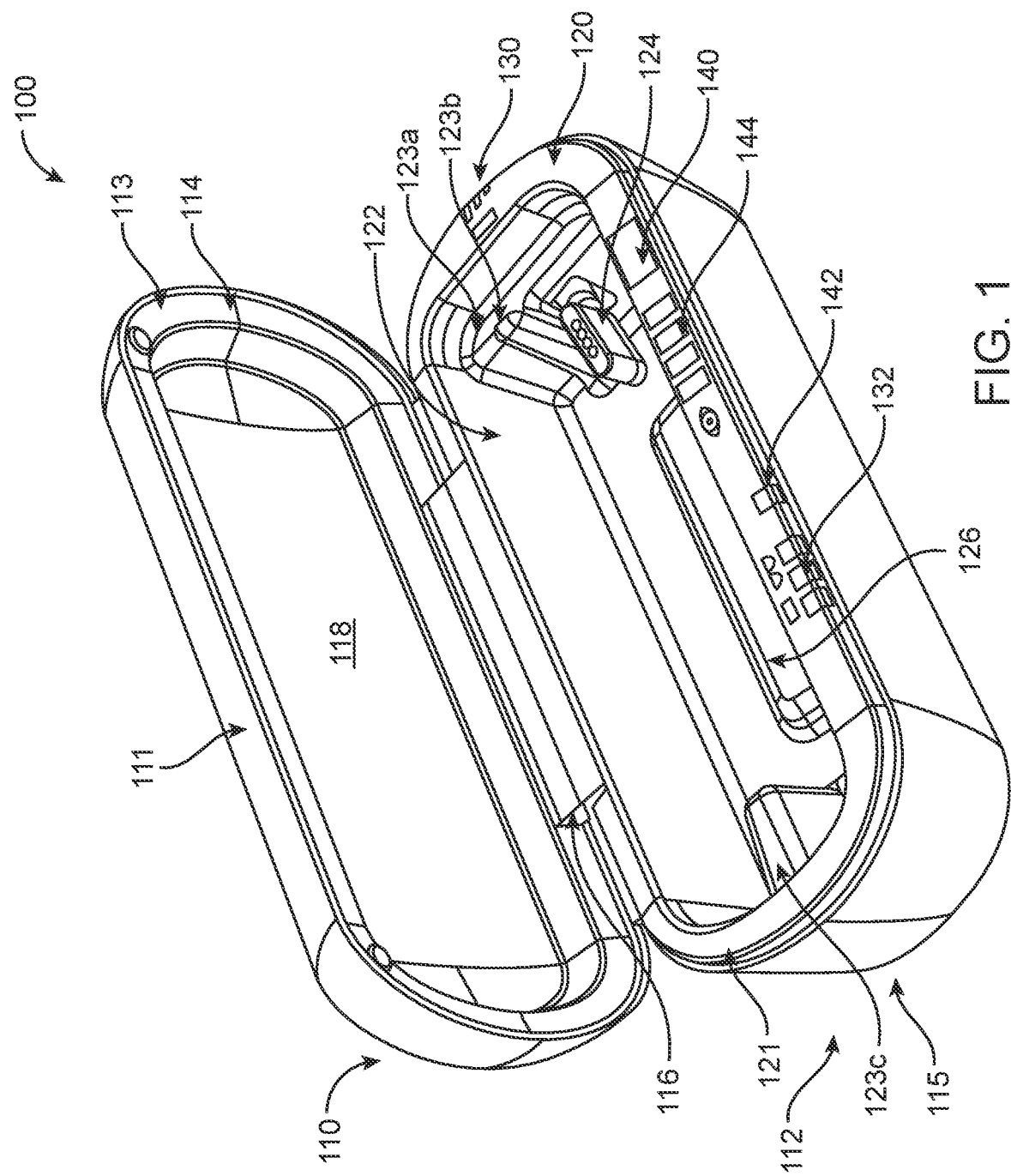
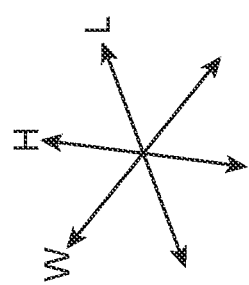
FIG. 1

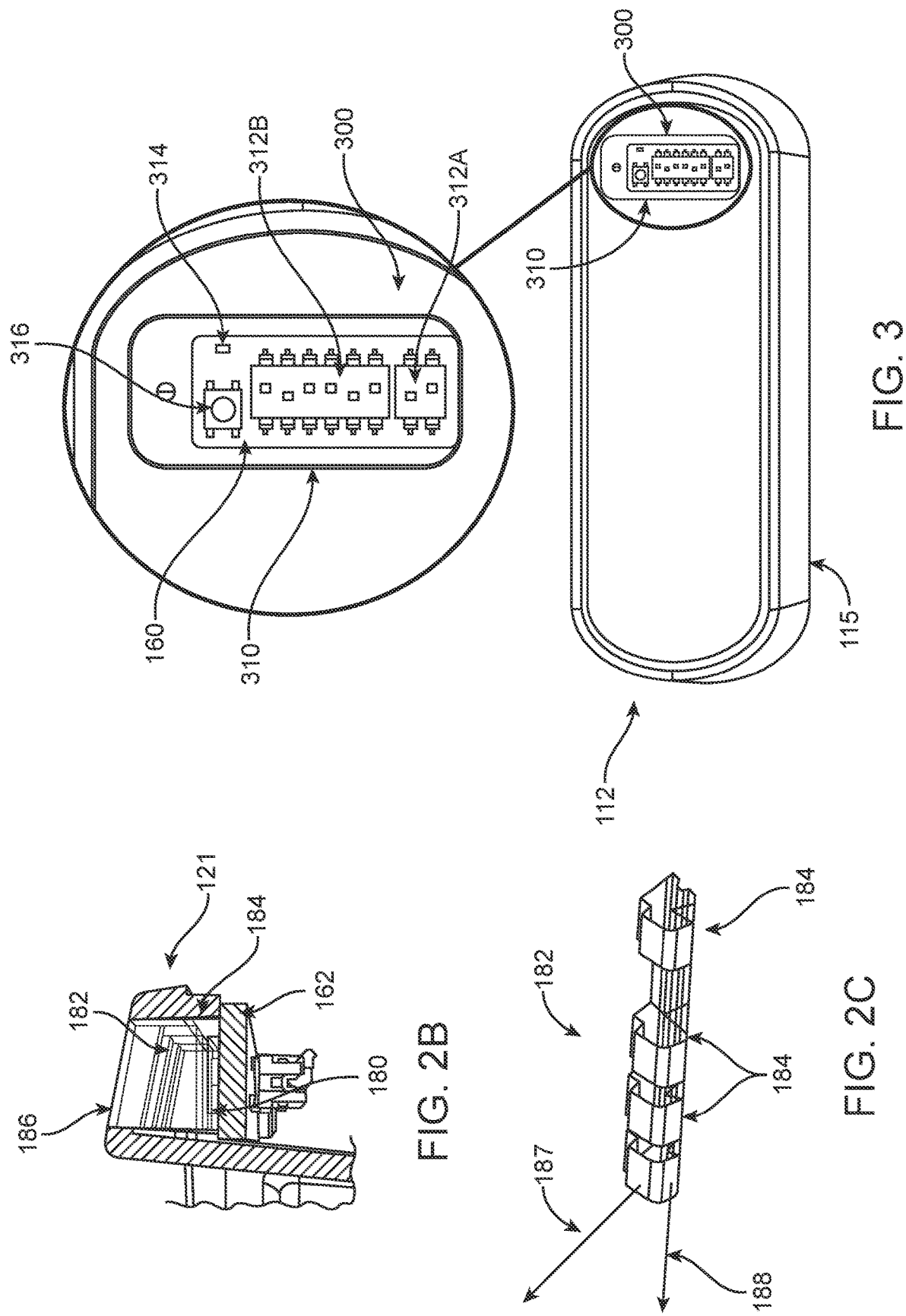

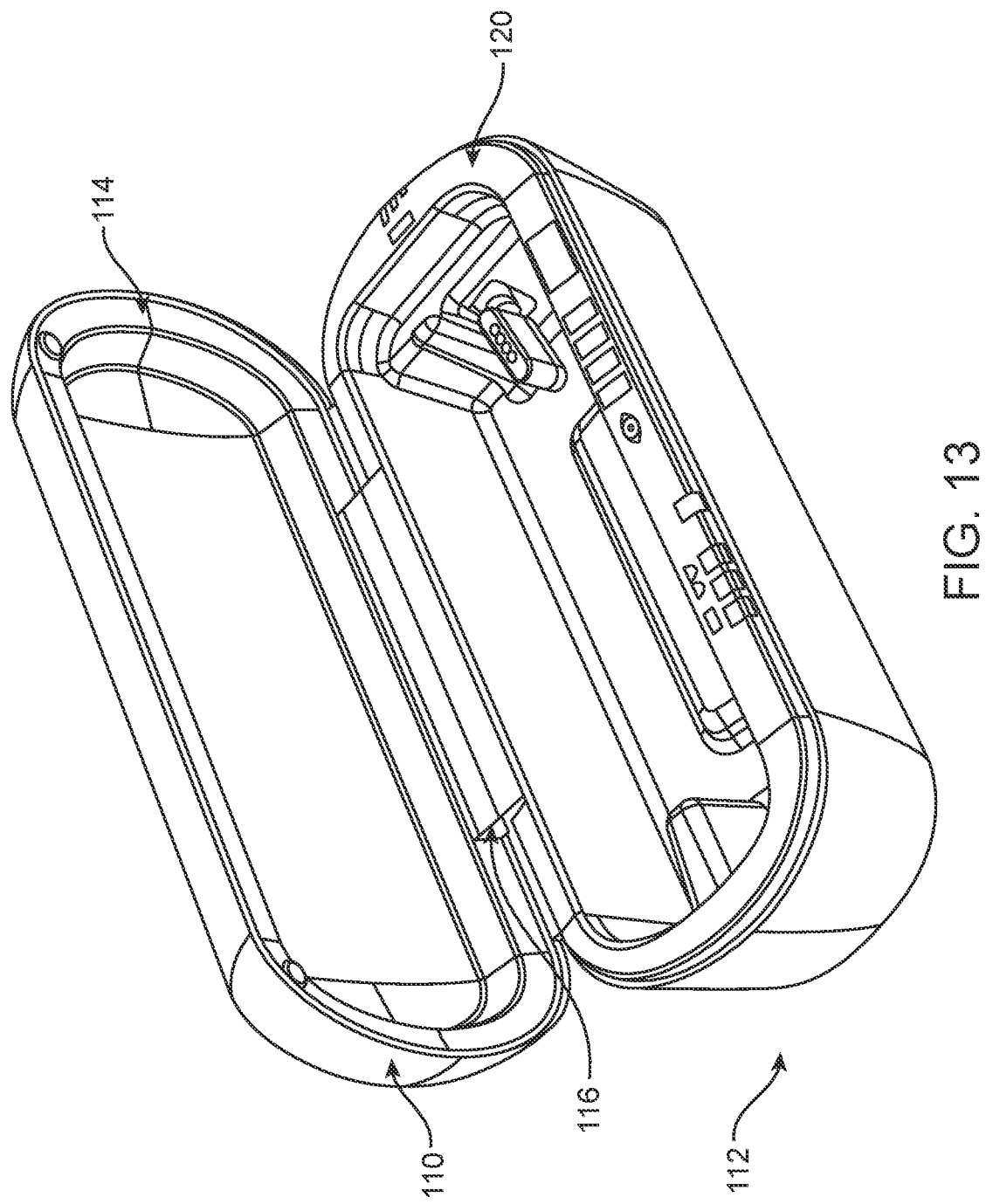

ELECTRONIC CASE FOR ELECTRONIC SPECTACLES

RELATED APPLICATIONS

This application is a continuation of U.S. patent application Ser. No. 17/662,805, filed May 10, 2022, now U.S. Pat. No. 11,460,720, issued Oct. 4, 2022, which is a continuation of U.S. patent application Ser. No. 17/302,479, filed May 4, 2021, now U.S. Pat. No. 11,366,341, issued Jun. 21, 2022, the disclosures of which are incorporated, in their entirety, by this reference.

BACKGROUND

Prior cases for electronic spectacles can be less than ideal in at least some respects. Electronic spectacles (hereinafter "eSpecs") are spectacles that use electronics to provide images to an eye of the wearer. Electronic spectacles may be used to provide simulation to a patient's eyes, such as to the retina, to treat refractive errors of the patient's eyes. Prior electronic cases for charging spectacles can be less than ideal for a number of reasons. The prior electronic cases may not provide for easy charging and monitoring of the status and usage of electronic spectacles associated with the electronic cases. This may result in problems, such as a patient's failure to use the electronic spectacles, premature energy depletion in the electronic spectacles, poor tracking of the patient's compliance with a prescribed amount of stimulation, and other issues.

SUMMARY

The electronic case disclosed herein, and the disclosed method of assembly and use with electronic spectacles, provide for an electronic spectacle case comprising components that can be configured in many ways and may comprise one or more of display and indicator components, user interface components, programming components, monitoring components, and power components. In some embodiments, the programming components of the case are used to configure the stimulation provided by the electronic spectacles. In some embodiments, the monitoring components receive or read information from the electronic spectacles to determine the patient's use and compliance with treatment and may transmit this information to a medical provider or display a summary of the information using indicator components. The programming and monitoring components provide more accurate control of the stimulation and monitoring of patient's use.

Protection of the electronic spectacles is also improved. By providing a case for charging and programming the electronic spectacles, the spectacles may remain in a protective environment during charging, programming, and monitoring. Thereby, reducing the risk of accidental damage to the electronic spectacles.

An electronic case for electronic spectacles may include a base comprising a cavity formed therein. A first spectacle retention device may be located within the cavity. The first spectacle retention device may be configured to retain spectacles. An electrical control system may be included. An electrical connector may be configured to couple the electrical control system in electronic communication with the spectacles.

An electronic case for electronic spectacles may include a processor and a non-transitory computer readable medium configured with instructions that when executed by the processor cause the processor to perform operations. The operations may include receiving spectacle stimulation configuration data, transmitting the spectacle stimulation configuration data to the electronic spectacles, receiving patient stimulation data from the electronic spectacles, and indicating patient compliance based on the received patient stimulation data.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 1 shows an electronic case for electronic spectacles, in accordance with some embodiments;

FIG. 2B shows a cross-section of the rim of an insert for an electronic case, in accordance with some embodiments;

FIG. 2C shows a light guide or an indicator, in accordance with some embodiments;

FIG. 3 shows components of an electronic case, in accordance with some embodiments;

FIGS. 8, 9, 10, 11, 12, and 13 shows steps of a method of assembling an electronic case, in accordance with some embodiments.

DETAILED DESCRIPTION

Figure 2A:
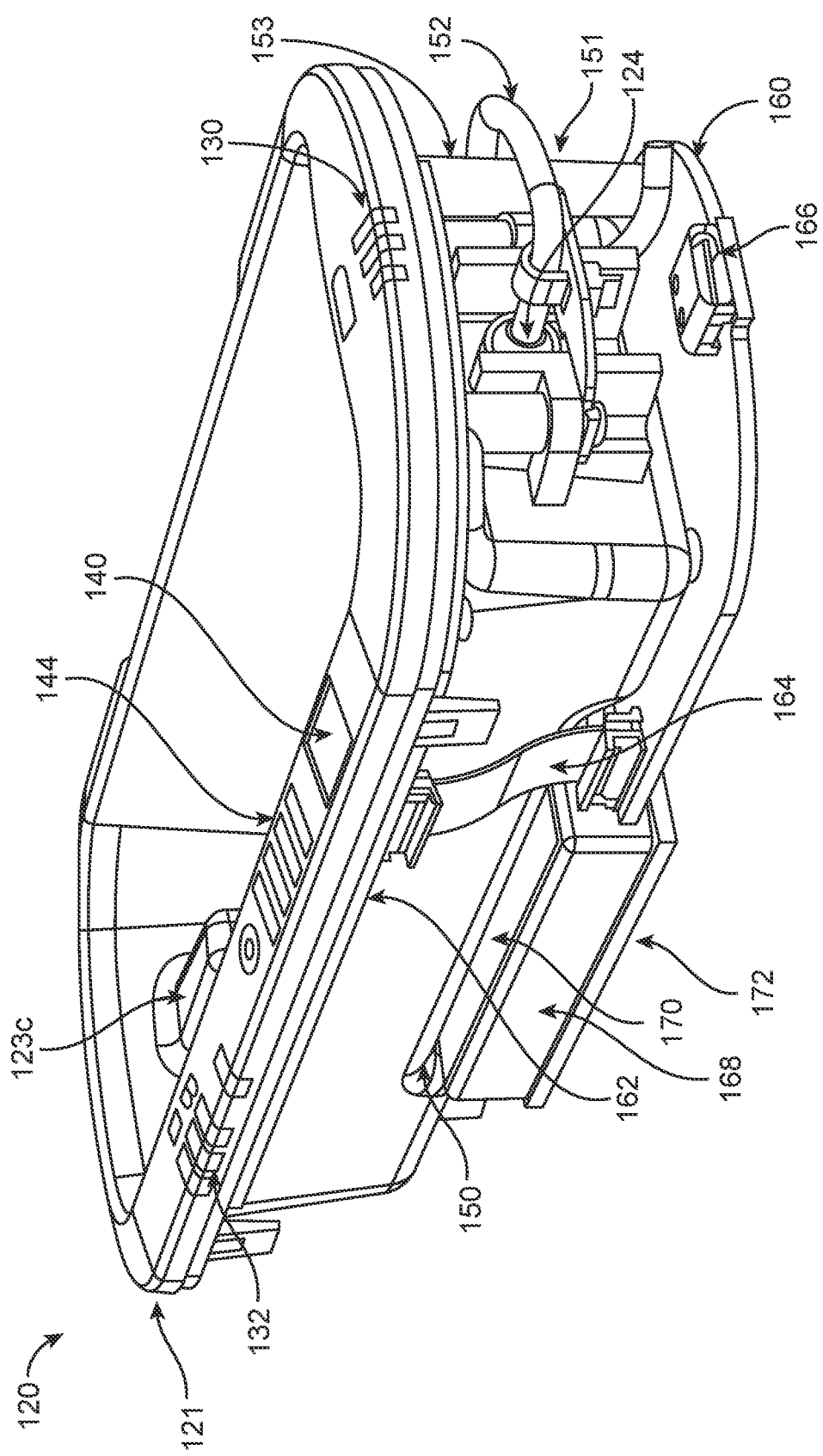
FIG. 2A shows an insert for an electronic case, in accordance with some embodiments.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The presently disclosed methods and apparatus can be configured in many ways to provide an electronic case for electronic spectacles and to make and use an electronic case, as described herein.

The presently disclosed methods and apparatus are well suited for combination with many prior devices such as, one or more of an ophthalmic device, a spectacle lens, a virtual reality (VR) display or an augmented reality (AR) display. For example, the systems, methods, and devices disclosed in PCT/US2020/044571, entitled "Device for Projecting Images on the Retina", filed on Aug. 5, 2020, and incorporated herein by reference in its entirety, are well suited for combination in accordance with the present disclosure.

Although specific reference is made to electronic cases for spectacle lenses, the presently disclosed methods and apparatus are well suited for use with any of the aforementioned devices, and a person of ordinary skill in the art will readily appreciate how one or more of the presently disclosed components can be interchanged among devices, based on the teachings provided herein.

The presently disclosed methods and apparatus are well suited for use with lenses for light therapy to treat refractive error of the eye to treat myopia. Work in relation to the present disclosure suggests that changes to choroidal thickness in response to stimulation on regions of the eye can be localized to regions near the stimulated regions, which can provide a somewhat localized response in accordance with some embodiments. In some embodiments, the changes to one or more of the choroid or sclera comprise a differential change, in which the changes to the one or more of the choroid or sclera are greater near the regions of stimulation than at corresponding regions remote from the stimulation (e.g. corresponding locations at an axis 90 degrees from the region of stimulation).

Work in relation to the present disclosure suggests systems and methods for treating refractive errors of the eye may benefit from the use of an electronic case for programming, monitoring usage, and charging electronic spectacles.

FIG. 1 shows an electronic case for electronic spectacles. The electronic case 100 includes a base 112 and a lid 110. The base 112 includes a cavity 122 for receiving and storing a pair of electronic spectacles. The lid 110 may be attached to the base 112 via a hinge 116. During use, a pair of electronic spectacles is placed within the base 112. After placing the electronic spectacles in the base, the lid may be swung closed to enclose the electronic spectacles safely within the case 100.

The lid 110 may comprise a plurality of parts. For example, the lid 110 shown in FIG. 1 includes an outer shell 111 and a lid insert 114. The outer shell 111 may include an outer surface made of a hard or impact resistant material. The lid insert 114 may be also be made from a hard or impact resistant material. In some embodiments, the insert may be coated with a softer material in order to avoid scratching any electronic spectacles within the case. The lid insert 114 may include a cavity or well 118 formed therein. The well 118 forms the upper portion of the interior cavity of the case for holding the electronic spectacles when the lid 110 is closed. The well 114 may be surrounded by a rim 113 that extends inward from the case lid insert 114. The rim 113 may be located about a perimeter of the lid insert 114.

A hinge 116 may couple the lid to the base. The hinge 116 may be any of many types of hinges. For example, the hinge may be a butt hinge, a piano hinge, or a living hinge. In some embodiments, a first hinge 116 may connect the case lid to the case base and a second hinge may be formed in the lid insert in order to cover the first hinge. In some embodiments, the first hinge may be a butt hinge or piano hinge and the second hinge may be a living hinge. In some embodiments, the first hinge is made of metal and the second hinge may be made of a polymer and may be integrally formed with the lid insert 114, the base insert 120, or both.

In some embodiments, a length of the case 100 may extend along a longest linear dimension of the case 100 and may extend parallel to a pivot axis of the hinge 116. A width of the case 100 may extend perpendicular to the length, such as from a side of the case 116 with the hinge towards a side opposite the hinge 116. A height of the case 100 may extend perpendicular to a plane formed by the length and width and may extend along a depth of the cavity 122.

The base 112 may comprise a plurality of parts. For example, the base 112 shown in FIG. 1 includes an outer shell 115 and a base insert 112. The outer shell 115 may include an outer surface made of a hard or impact resistant material. The base insert may also be made from a hard or impact resistant material. In some embodiments, the insert may be coated with a softer material in order to avoid scratching the electronic spectacles when they are placed within the case. The base insert 115 may include a cavity or well 122 formed therein. The cavity 122 forms the lower portion of the interior cavity of the case for holding the electronic spectacles. The cavity 122 may be surrounded by a rim 121 that extends inward from the outer perimeter of the base insert 120.

The base insert and the base cavity 122 may be configured with many shapes and features. In some embodiments, the base insert 120 may include one or more spectacle retention structures 123. The spectacle retention structures 123 may be shaped or configured to support or retain the spectacles within the base cavity 122.

Figure 5:
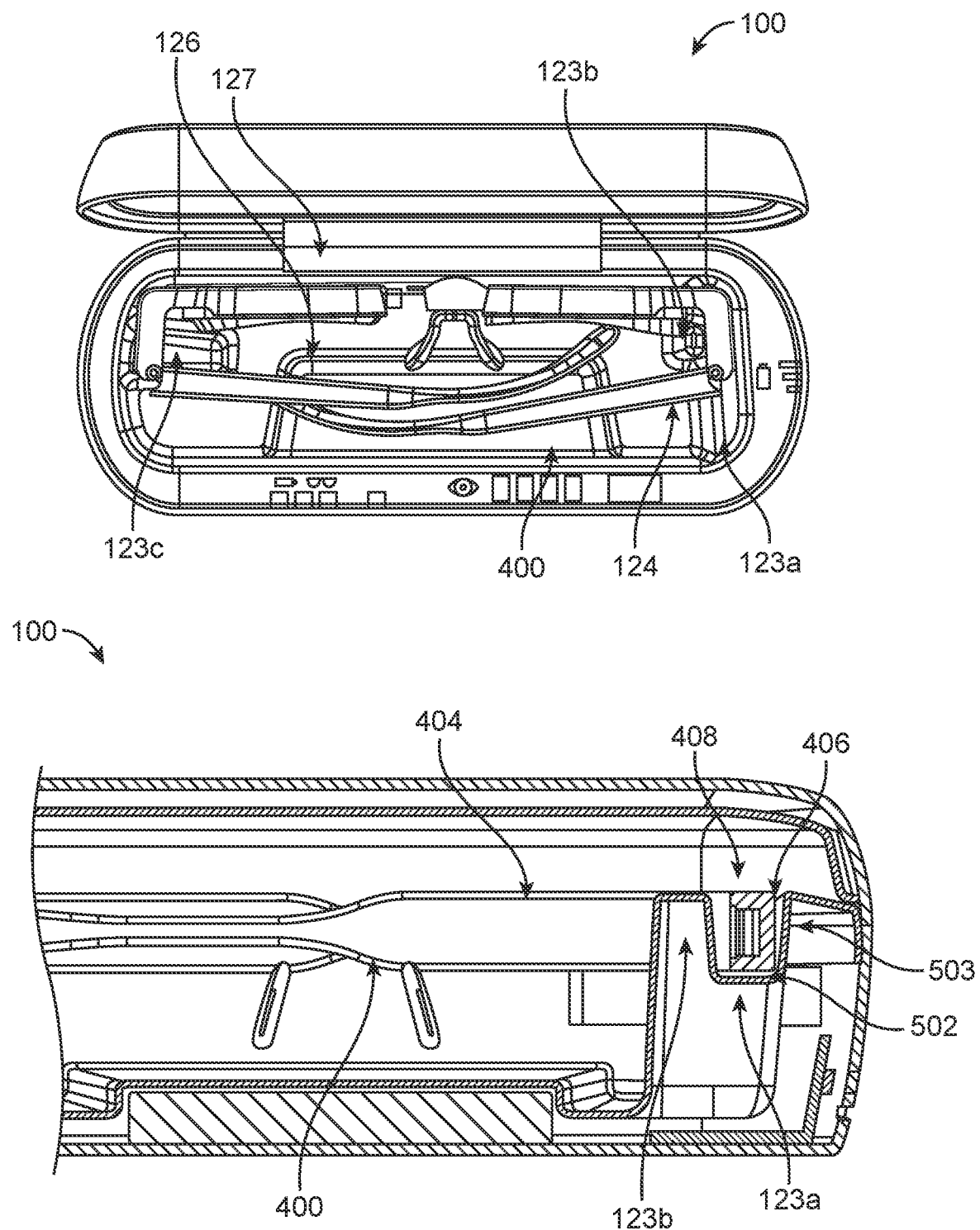
FIG. 5 shows a top view and a cross section of an electronic case with electronic spectacles, in accordance with some embodiments.

Spectacle retention structure 123a shown on the right side of the base insert 120 extends from an inner sidewall of the base insert 120 into the base cavity 122. The spectacle retention structure 123a may include a shelf configured to receive and support the end piece and/or hinge of a pair of spectacles, for example as shown in FIG. 5, discussed herein. The surface of the shelf may be substantially parallel to a bottom inner surface of the base cavity 122. In some embodiments, the shelf extends from the front of the base cavity 122 to the back of the base cavity 122, such as from a front side wall to a back side wall of the base cavity 122. The shelf may extend along a width of the cavity 122. The shelf may have a height that is about the distance from a bottom of a spectacle frame at the lens portion of the spectacles to a bottom of a temple or end piece portion of the spectacles that are to be placed in the case 100. The shelf may have a length that extends from a sidewall of the cavity that is about the width of an end piece or temple of the spectacles.

In some embodiments, the base insert 120 may include a second spectacle retention structure 123b. The second spectacle retention structure 123b may extend from a sidewall and/or the bottom surface of the cavity 122 and may include a protrusion. The protrusion may extend along a height or depth of the case 100. A channel or well may be formed between the protrusion and the sidewall of the cavity 122. The channel or well may engage with an end piece of the spectacles in order to retain the spectacles within the channel or well. The protrusion may have a height that is greater than the distance from a bottom of a spectacle frame at the lens portion of the spectacles to a bottom of a temple or end piece portion of the spectacles that are to be placed in the case 100. The protrusion may have a width that corresponds to a length of an end portion of the spectacle. In some embodiments, the height may be less than or equal to the distance between a temple piece and the lens portion of a spectacle frame when the temple piece is in a closed position, for example as shown in FIG. 5. The protrusion may have a depth In some embodiments, the base insert 120 may include a third spectacle retention structure 123c. The third spectacle retention structure 123c may extend from a sidewall and/or a bottom surface of the cavity 122. The retention structure 123c may extend along a height or depth of the case 100. In some embodiments, the retention structure 123c may form a shelf. In some embodiments, the retention structure 123c has a height that is about the distance from a bottom of a spectacle frame at the lens portion of the spectacles to a bottom of a temple or end piece portion of the spectacles that are to be placed in the case 100. In some embodiments, the retention structure 123c has a length that is configured to extend along and support the lower surface of a temple piece of a spectacle frame.

In some embodiments, the base insert 120 may include a protrusion 126 that extends from a bottom surface of the base cavity 122. In some embodiments, the protrusion may also extend from a front side wall of the base cavity 122. In some embodiments, the protrusion may have a length that is less than the length of the base cavity and/or the length of the bottom surface of the base cavity 122. In some embodiments, the protrusion may have a width that is less than the width of the base cavity and/or the width of the bottom surface of the base cavity 122. In some embodiments, a channel is formed between the protrusion, the bottom surface, and a back sidewall of the cavity 122. The channel may be sized and shaped to receive the lens frames of the spectacles when the spectacles are placed in the cavity 122. Channels may also be formed between the left and right sidewalls of the base cavity and the protrusion. These channels may be sized and shaped to receive the temple tips, sometimes referred to as earpiece of the spectacle frames. In some embodiments, the protrusion may include a shelf which has a height extending from the bottom surface of the cavity. The height may be between 1 mm and 20 mm. In some embodiments, the height may be between 1 mm and 10 mm. In some embodiments, the height may be between 1 and 5 mm. In some embodiments, the channels may have a depth extending from an upper surface of the protrusion to the lower surface of the cavity. The depth may be between 1 and 20 mm. In some embodiments, the depth is less between 1 and 10 mm.

The case 100 may include an electrical connector 124 for coupling the electronic circuits of the case to the electronic circuits of the spectacles. In some embodiments, the electrical connector 124 may include both electrical and mechanical connectors. For example, the electrical connector 124 includes four electrical contacts, such as pins, that connect to electrical contacts, such as pads, on the spectacles. The electrical contacts may provide electrical power from the case to the spectacles, such as for charging batteries within the spectacles, and may also provide electrical communication between the case and the spectacles, for example, for programming the stimulation provided by the spectacles and for receiving patient compliance data from the spectacles. The mechanical connections may include magnets in the electrical connector 124 with a polarity that is configured to attract corresponding magnets in the spectacle frames. In this way, the electrical connector 124 may be mechanically coupled to a corresponding electrical connector on the spectacle frame. In some embodiments, the electrical connector may have a shape, such as a rectangular shape wherein the small sides are radius with a radius equal to half of the dimension of the small sides. In some embodiments, the radius may be between one half and one quarter the dimension of the small sides. In some embodiments, the dimension may be a distance between the long sides. In some embodiments, the shape may be referred to as a stadium shape which comprises a rectangle with semi circles at a pair of opposite ends of the rectangle. In some embodiments, the spectacle frame may have a recess with a shape that corresponds to the shape of the electrical connector 124 in order to receive the electrical connector therein.

The case 100 may also include a user interface and display system. In some embodiments, the user interface and display system may include indicators 130, 132, 140, 142, and 146. In some embodiments, the case may also include a user interface for programming the case and the electronic spectacles. The user interface for programming may be located in many places, for example, on a bottom side of the case and described herein with respect to FIG. 3. The indicators of the user interface may be located in many positions on the case 100. In some embodiments, the indicators may be located on or about the rim 121 of the case 100. In some embodiments, the rim may be part of the base insert, as shown in FIG. 1. In some embodiments, the rim may be part of the shell 115.

The power indicator 130 may provide visual indication of the amount of energy remaining in an energy storage device within the case 100. In some embodiments, the power indicator 130 may include one or more sub indicators. The indicator 130 or the sub indicators may include a light guide positioned on the rim of the case and a light source such as an LED associated with each of the light guides. In the example shown in FIG. 1, the power indicator 130 includes three sub indicators. Each sub indicator may represent a relative quantity of power remaining within the energy storage device of the case. For example, with three indicators each indicator may represent one third the total capacity of the energy storage device such that when one indicator is illuminated the energy storage device is at or below one third of its energy capacity. When two indicators are illuminated, the energy storage device may be between one third and two thirds of its total capacity. When three indicators are illuminated, the energy storage device may be above two thirds of its total capacity, at full capacity, or at greater than 90% capacity.

In some embodiments, the indicators may have a plurality of functions. For example, in order to indicate that the energy storage device, such as a battery or capacitor, is charging and has less than one third of its total capacity, a single indicator or sub indicator may be blinking whereby its illumination is cycled on and off periodically such as a period of 1 Hz. Similarly, if the single indicator is illuminated and a second indicator is blinking, then the energy storage device may be charging and have a charge state of between one third and two thirds its total capacity. Finally, if two indicators are illuminated and a third indicator is blinking, then the energy storage device may be charging and have a charge state of greater than one third of its total capacity.

In some embodiments, the power indicator 130 may shaped such that indicator is viewable when the case is open, for example, when the lid is rotated away from the base, and when the case is closed, for example, when the lid is rotated over the base. In some embodiments, the power indicator 130 may include light guides with more than one illuminated surface. For example, in some embodiments, the light guides of the indicator 130 may include a first surface that faces a first direction that is covered by the lid when the lid is closed, and a second surface that faces a second direction that is not covered by the lid when the lid is in the closed position. In some embodiments, the first direction may be along the height direction and the second direction may be a direction outward from the perimeter of the case 100. In some embodiments, an angle between the first direction and the second direction may be less than 90 degrees.

The case power indicator 130 may interface with a processor of the case that reads the charge status of the energy storage device, including both remaining capacity and whether or not the energy storage device is currently being charged. The processor illuminates the case power indicator 130 appropriately based on the charge status of the energy storage device.

In some embodiments, the case 100 may include a spectacle power indicator, such as spectacle power indicator 132. The spectacle power indicator 132 may provide visual indication of the amount of energy remaining in an energy storage device within the spectacles 400. In some embodiments, the spectacle power indicator 132 may include one or more sub indicators. The indicator 132 or the sub indicators may include a light guide positioned on the rim of the case and a light source such as an LED associated with each of the light guides. In the example shown in FIG. 1, the power indicator 132 includes three sub indicators. Each sub indicator may represent a relative quantity of power remain within the energy storage device of the spectacles 400. For example, with three indicators, each indicator may represent one third the total capacity of the energy storage device such that when one indicator is illuminated, the energy storage device is at or below one third of its energy capacity. When two indicators are illuminated, the energy storage device may be between one third and two thirds of its total capacity. When three indicators are illuminated, the energy storage device may be above two thirds of its total capacity.

In some embodiments, the spectacle power indicator may have a plurality of functions. For example, in order to indicate that the energy storage device, such as a battery or capacitor within the spectacles, is charging and has less than one third of its total capacity, a single indicator or sub indicator may be blinking whereby its illumination is cycled on and off periodically such as a period of 1 Hz. Similarly, if the single indicator is illuminated and a second indicator is blinking, then the energy storage device may be charging and have a charge state of between one third and two thirds its total capacity. Finally, if two indicators are illuminated and a third indicator is blinking, and the energy storage device may be charging and have a charge state of greater than one third of its total capacity.

In some embodiments, the power indicator 132 may be shaped such that indicator is viewable when the case is open, for example, when the lid is rotated away from the base, and when the case is closed, for example, when the lid is rotated over the base. In some embodiments, the power indicator 132 may include light guides with more than one illuminated surface. For example, in some embodiments, the light guides of the indicator 132 may include a first surface that faces a first direction that is covered by the lid when the lid is closed, and a second surface that faces a second direction that is not covered by the lid when the lid is in the closed position. In some embodiments, the first direction may be along the height direction and the second direction may be a direction outward from the perimeter of the case 100. In some embodiments, an angle between the first direction and the second direction may be less than 90 degrees.

In some embodiments, the case power indicator 132 may interface with a processor of the case that reads the charge status of the energy storage device of the spectacles via the connector 124. The charge status may include both remaining capacity and whether or not the energy storage device is currently being charged. The processor may then illuminate the spectacle power indicator 132 appropriately based on the charge status of the energy storage device. In some embodiments, the processor may read the charge state of the battery directly via the power connections in the connector 124. In some embodiments, the processor of the case may communicate with a processor or memory of the spectacles 124 and receive the charge state information from the processor or memory of the spectacles.

In some embodiments, the case 100 may include a compliance indicator 144. Compliance is a measure of the extent to which the patient's behavior matches the doctor's recommendations or prescription. The compliance indicator 144 may display or otherwise indicate how well a patient is complying with their prescribed or programmed treatment. The prescribed program treatment may be input into the case in many ways. For example, as discussed elsewhere herein, the case may include a programming interface whereby a user can adjust usage settings for the spectacles. In some embodiments, the spectacles in the case may be programmed through other means, such as for wirelessly as described elsewhere herein.

The spectacles may record their use. In some embodiments, the spectacles may record the amount of time the spectacles are worn by the patient and turned on to provide stimulation to the patient's eyes. In some embodiments, the spectacles may automatically turn off after their prescribed or programmed amount of stimulation is applied. In some embodiments, the spectacles may store in memory the amount of time they have provided stimulation to a patient's eye. When the spectacles are placed back in the case after use and connected to the case via the electrical connection 124, the circuitry within the case, such as its processor, may access memory and/or the processor within the spectacles to read or otherwise receive the patient usage data stored within the spectacles. The retrieved usage data may be compared to the prescribed or programmed stimulation and an amount of compliance may be determined, such as determining a percentage of compliance by dividing the recorded stimulation provided by the spectacles by the prescribed or programmed stimulation.

The amount of stimulation may be prescribed based on a single day usage, weekly usage, monthly usage, or usage over other time frames. For example, the stimulation may be prescribed or programmed as four hours of stimulation every day. If the patient received at least the prescribed or programmed amount of stimulation, such as four hours of stimulation, then compliance is considered to be 100%. If the patient has received less than the prescribed or programmed amount of stimulation, such as three hours of stimulation, and the patient has 75% compliance. This compliance information may be displayed on the compliance indicator 144.

In some embodiments, the compliance indicator 144 may include one or more sub indicators. The compliance indicator 144 or the sub indicators may include a light guide positioned on the rim of the case and a light source such as an LED associated with each of the light guides. In the example shown in FIG. 1, the compliance indicator 144 includes four sub indicators. Each sub indicator may represent a relative amount of a patient's compliance with the prescribed or programmed stimulation. For example, with four indicators, each indicator may represent compliance with one quarter of the prescribed or programmed stimulation such that one illuminated indicator represents a compliance of at least 25% or between 25% and less than 50% compliance. When two indicators are illuminated, the patient may have between 50% and less than 75% compliance with the prescribed or programmed stimulation. When three indicators are illuminated, the patient may have between 75% and less than 100% compliance with the prescribed or programmed stimulation. When four indicators are illuminated, the patient may have complied with greater than 95% or 99%, such as 100%, of the prescribed or programmed stimulation. In some embodiments, the compliance indicator may include one or more displays to display the compliance data in numerical format, for example such as with one or more seven segment displays, LED, OLED, or LCD displays.

In some embodiments, the indicators described herein may have more or fewer sub indicators and their illumination may indicate a corresponding fraction of the amount of compliance, energy, or other data. For example, with 10 sub indicators each indicator represents 10% compliance or energy.

The compliance indicator and the measurement of patient compliance may be based on an internal calendar or other time measuring means within the case or the spectacles. In some embodiments, the compliance indicator may measure compliance over a manually reset interval. In some embodiments, the case may include a button 140 for resetting the compliance interval. During use, when the compliance button 140 is pressed, the currently recorded amount of compliance is reset to zero. The spectacles may then begin recording the accumulated amount of stimulation provided to the patient by the spectacles.

After at least some use by the patient, the patient may place the spectacles back into the case and connect the spectacles to the electronic connector 124, after which the case may read or otherwise received the usage data from the spectacles and display the amount of compliance on the compliance indicator 144. If the patient is not fully complied with the prescribed or programmed stimulation, then the patient may take the spectacles out of the case and wear them for additional time and later place them back into the case at which time the compliance indicator may again indicate an updated amount of compliance. At the end of the day or other compliance measuring period of time, the patient may record the number of illuminated lights or otherwise record the amount of compliance indicated and then may press the compliance button 142 reset the compliance information back to zero.

The case 100 may also include a status indicator 142. The status indicator may be a general-purpose indicator that informs the user of errors or other problems with the case and or the spectacles. For example, in some embodiments, the status indicator 142 may be a multicolor status indicator that may be related in different colors to indicate various statuses to the patient or user. For example, the status indicator may be illuminated to indicate a communication problem between the case and the spectacles, a fault within the memory or processors of the spectacles and/or the case, or other issues. The illumination of the status indicator may indicate that a user should bring the device to the prescribing doctor or assistance.

The indicators described herein may be single color or multicolor. In some embodiments, a single-color LED may be placed below or relative to each indicator or sub indicator and the corresponding light guide in order to illuminate the corresponding portion of the indicator. In some embodiments, a single multicolor LED or a plurality of different colored LEDs may be placed below or relative to each indicator or sub indicator and the corresponding light guide in order to illuminate this corresponding portion of the indicator. In some embodiments, the colors and type of illumination may indicate different statuses to the user. For example, the case power and spectacle power indicators may be a single indicator or set of sub indicators wherein illuminating the sub indicators with a first color indicates the amount of energy remaining in the spectacles while illuminating the indicators with a second color indicates the amount of energy remaining in the case. In some embodiments, an indicator may the illuminated with a third color to indicate compliance. In this way, a single indicator may be used to indicate energy for the spectacles and the case and patient compliance with the prescribed or programmed stimulation.

FIG. 2A shows the base insert 120 for the electronic case 100. The base insert 120 is shown removed from the shell 115 of the case 100 and shows the internal mechanical and electrical systems of the case 100. One or more circuit boards may be located within the case between the shell and the base insert. In some embodiments, the circuit boards may be coupled to the base insert. For example, as shown in FIG. 2A, a first circuit board, which may be an interface circuit board 162, may be coupled to the base insert at the rim 121 and a second circuit board, which may be a main logic board 160 that carries a processor and memory, may be coupled to the bottom of the base insert. An electrical coupling 164 which may be a ribbon cable, a flexible flat cable (FFC), or a flexible printed circuit (FPC) connector, may couple the components of the main logic board 160 with the components of the interface circuit board 162.

The main logic board 160 may be arranged in many ways and may include many components. In some embodiments, the main logic board includes a power input and wired communication input such as the electrical connection 166. The electrical connection 166 may be accessible from outside the case 100 after the case is assembled. The electrical connection 166 may be a USB connection, a power connection, a FireWire connection, an ethernet connection, or other serial or parallel communication connection. The logic board 160 may include a processor and non-transitory memory for storing data and instructions that when executed by the processor cause the processor to carry out any of the methods or processes described herein. The main logic board may also include wireless communication components for communicating wirelessly with other devices such as computers, servers, and electronic spectacles 400.

The logic board 160 may also be electrically coupled to the electronic connection 124, discussed above with respect to FIG. 1, that electrically couples the spectacles 400 to the logic board 160 and the components thereon. A wire bundle 151 may couple the connector 124 to the logic board 160. In some embodiments, a strain relief 152 may be built into the wire bundle 151. As shown in FIG. 2A, the strain relief is formed by wrapping the wire bundle 151 around a post formed as part of the base insert 120.

The logic board 160 may also include or be electronically coupled to voltage regulators and one or more energy storage devices. For example, the case 100 includes an energy storage device 168, which may be a battery. The battery 168 may be physically and electrically coupled to the logic board 160 and may receive power through the electronic connection 166. The battery may also supply power through the logic board and the connector 124 to the spectacles 400. In some embodiments, the energy storage device 168 may be physically coupled to the base insert 120. As shown in FIG. 2A, an adhesive 170 which may be double-sided tape, clue, epoxy, or other material, it hears or couples the energy storage device 168 two the base insert 120. In some embodiments, the energy storage device 168 may be located within a recess formed in the bottom surface of the base insert 120. In some embodiments, the recess 150 in the bottom of the base insert forms the protrusion 126 in the base cavity 122, see FIG. 1. In some embodiments, a second adhesive 172 which may be a single-sided foam sheet, may be adhered to a bottom of the energy storage device 168. After assembly the phone sheet may be located between the energy storage device 168 formed the base shell 115.

The interface logic board 162 may be located about or within the rim 121 of the base insert 120. The interface logic board 162 may include input devices and indicators. For example, the interface logic board 162 may include light sources such as LEDs that are used to provide the illumination for the indicators 130, 132, and 144. Interface logic board 162 may also include an input device such as the button 140 for receiving user input. The button 140 may be a momentary tactile switch that is normally open. In some embodiments, a flexible cover may be placed within an aperture of the rim above the button 140, such that the flexible cover deflects as the user presses their finger on the cover which causes the underside of the cover to contact the switch which registers the user's input, such as by resetting the compliance monitor.

The interface logic board 162 may follow the contour and shape of the rim 121 and/or the perimeter of the base insert 120. In some embodiments, the interface logic board may extend along at least one third of the rim 121 and/or the perimeter of the base insert 120. In some embodiments, the interface logic board 162 may be arranged in a plane parallel to the main logic board 160.

FIG. 2B shows a cross-section of the rim 121 of the base insert 120. The interface logic board 162 is arranged across a channel 184 formed by the rim 121 of the base insert 120. The switch or button Laos be mounted on the interface logic board 162 and protrude into the channel 184. Similarly, LEDs 180 or other light sources may protrude from the interface logic board 162 into the channel 184 may be arranged to emit light into the channel 184. A light guide 182 may be located in a channel between the light sources 180 and apertures 186. The apertures and the light guide may extend through the wall of the rim 121 between the channel and the location outside the rim 121. The light guide 182 may receive the light from the light source 180 and through internally reflective surfaces, may transmit the light out through the aperture 186. In some embodiments, the light guide 180 and apertures 186 may be located on a first side of the rim 121 such that light is radiated in a first direction and when the lid of the case is closed the apertures, the light guide 182 is covered, such as shown in FIG. 2B. In some embodiments, the apertures and the light guides may extend from a first side of the rim to a second side of the rim such that light is radiated in a plurality of directions and at least a portion of the apertures and the light guide 182 are exposed when the lid of the case is closed, allowing light to radiate outside the case even when the lid of the case is closed.

For example, in FIG. 2C, a light guide 182 is shown having a plurality of elements 184 through which light radiates in a first direction 187 which may be occluded by the case lid when the lid is closed and in a second direction 188 that is not occluded by the case lid when the lid is closed. The light guide 182 shown in FIG. 2C, may be used in conjunction with corresponding apertures formed in the rim 121. In some embodiments, the light guide 182 may be integral to the rim 121 and the insert 120. In some embodiments, the light guide 182 may be inserted into the rim and the apertures during assembly as discussed herein.

FIG. 3 shows the programming interface 300 for programming the case and associated spectacles. In some embodiments, the main logic board 160 may be accessible through an opening or aperture 310 in the shell 115 of the base 112. The programing interface 300 may include one or more switches 312 mounted on the logic board 160 and accessible through the opening 310. The switches may be used to program the stimulation provided by the spectacles 400. The switches may be binary switches wherein they are either on or off, set to 1 or 0, respectively. In some embodiments, a first set of switches 312A may be used to program the eyes are stimulated during treatment. With two switches 312A, the case and spectacles may be programmed to provide stimulation to no eyes, the left eye, the right eye, or both eyes, as shown in Table 1.

TABLE 1

| Eye Stimulus Programming | | |
|---|---|---|
| Switch 1 | Switch 2 | Stimulus Eye |
| 0 | 0 | None |
| 0 | 1 | Right Eye |
| 1 | 0 | Left Eye |
| 1 | 1 | Both Eyes |

In some embodiments, a second set of switches 312B may be used to program the recommended or prescribed duration of treatment. In some embodiments, each single switch may be used to indicate the duration of treatment. In some embodiments, only one switch may be in the on position for programming. Table 2 shows one example of the programming for stimulus duration.

TABLE 2

| Eye Stimulus Programming | | | | | | |
|---|---|---|---|---|---|---|
| Switch 1 | Switch 2 | Switch 3 | Switch 4 | Switch 5 | Switch 6 | Stimulus Duration |
| 1 | 0 | 0 | 0 | 0 | 0 | 1 Hour |
| 0 | 1 | 0 | 0 | 0 | 0 | 2 Hours |
| 0 | 0 | 1 | 0 | 0 | 0 | 3 Hours |
| 0 | 0 | 0 | 1 | 0 | 0 | 4 Hours |
| 0 | 0 | 0 | 0 | 1 | 0 | 5 Hours |
| 0 | 0 | 0 | 0 | 0 | 1 | 6 Hours |

In some embodiments, each switch may be used to program a portion of the duration of treatment. The sum of the durations may be added together to determine the total stimulus duration. Table 3 shows examples the programming for stimulus duration.

TABLE 3

| Eye Stimulus Programming | | | | | | |
|---|---|---|---|---|---|---|
| Switch 1 1 Hour | Switch 2 2 Hours | Switch 3 3 Hours | Switch 4 4 Hours | Switch 5 5 Hours | Switch 6 0.5 Hours | Stimulus Duration |
| 1 | 0 | 0 | 0 | 0 | 0 | 1 Hour |
| 1 | 1 | 0 | 0 | 0 | 1 | 3.5 Hours |
| 0 | 0 | 1 | 1 | 0 | 0 | 7 Hours |
| 0 | 0 | 0 | 1 | 0 | 0 | 4 Hours |
| 0 | 1 | 0 | 0 | 1 | 0 | 7 Hours |
| 1 | 1 | 1 | 1 | 1 | 1 | 15.5 Hours |

In some embodiments, after setting the switches in their appropriate state the settings may be transferred to the case and/or the spectacles my pressing a confirmation or programming set button or switch such as button 316. Pressing button 316 may cause the processor may case to read the values of the switches and then program the spectacles 400 with the appropriate stimulation and based on the values of the switches.

In some embodiments, the programming interface may include a status indicator. The status indicators may illuminate in a first color to indicate it is ready to be programmed, a second color to indicate that the case is programmed correctly, such as after the user pressed the programming button 216, and a third color to indicate an error in programming.

Figure 4:
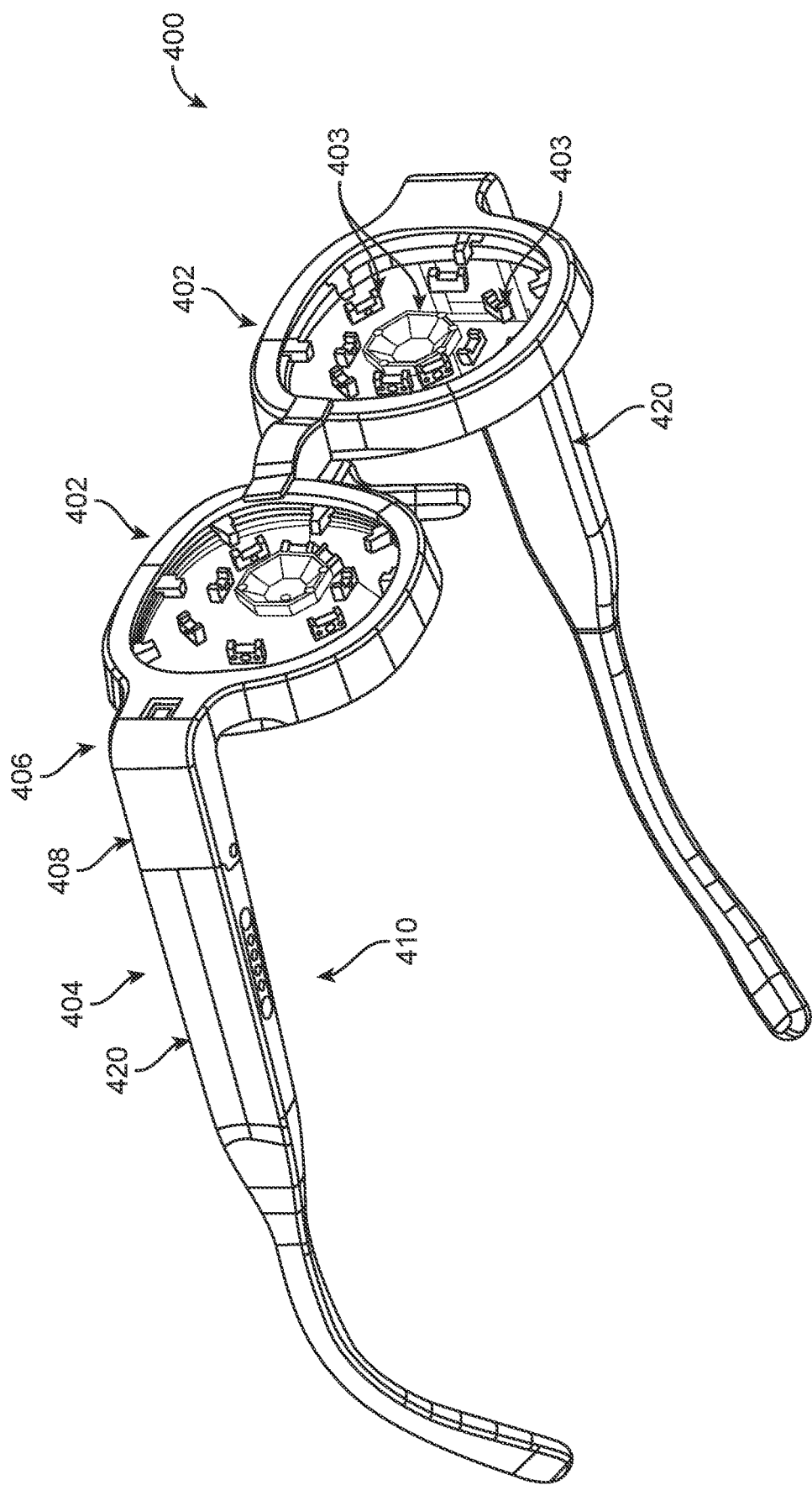
FIG. 4 shows electronic spectacles for use with an electronic case, in accordance with some embodiments.

FIG. 4 depicts an electronic spectacle 400 configured to project a defocused image on the retina away from the central field that includes the macula in order to stimulate a change in choroidal thickness. The electronic spectacle 400 may include a pair of lenses 402 that may be corrective lenses to correct for refractive errors of a patient's eye. The lens is 402 may also include optical and electrical components 403 for the treatment of refractive errors of the patient's eyes. The components 403 may include one or more light injectors, lenses, or mirrors for the controlled projection of images onto the patient's retina, as described in more detail herein.

In some embodiments, for the treatment of spherical refractive errors of the eye, the plurality of light sources, such as projection units, are arranged with symmetrically with respect to central axis of the spectacle lens, the center of the spectacle lens, or another location of the spectacle lens. The symmetry may be rotational symmetry, such that the light sources are arranged on a circumference centered on the location of the spectacle lens.

In some embodiments, for example, for the treatment of astigmatism, the electronic spectacle 400 is configured to project defocused images with respect to the astigmatic axes of the patient's eye to provide different amounts of stimulation to different regions of the peripheral retina. In some embodiments, the light sources such as projection units are located along the astigmatic axis, although the light sources may be located at other locations. The light sources can be configured to provide different amounts of stimulation to the peripheral retina in accordance with the refractive error of the eye. In some embodiments, the light sources are configured to provide different amounts of illumination along different axes in order to promote different changes in choroidal and scleral tissue corresponding to different changes in axial length as described herein. The spectacle lens may comprise an optical zone configured to correct astigmatic refractive errors in accordance with the first axis and the second axis.

In some embodiments, the spectacle lenses 402 may include an optical zone that can be appropriately sized for the pupil of the eye and the illumination conditions during treatment. The central optical zone is designed to provide emmetropic correction or other suitable correction to the wearer and may be provided with both spherical and astigmatic correction. The central optical zone is circumscribed by an outer annular zone, such as a peripheral zone. The optical zone is configured to provide refractive correction and can be spherical, toric or multifocal in design, for example with a visual acuity of 20/20 or better.

The spectacle lenses 402 includes a plurality of embedded projection units. Each of the plurality of projection units comprises a light source and one or more optics to focus light in front of the retina as described herein. Each of the optics may comprise one or more of a mirror, a plurality of mirrors, a lens, a plurality of lenses, a diffractive optic, a Fresnel lens, a light pipe or a wave guide.

The spectacles 400 may include two temple portions 404. The temple portion of the spectacles may be connected via a hinge 408 to an end piece 406. The end piece 406 couples the hinge to the frame of the lenses 402. The temple piece 404 may include a cavity 402 for housing electrical and control system of the electronic spectacles 400. An electrical connection 410 may be included in the spectacles 400. In some embodiments, the electrical connection 410 may be located on a temple 404 of the spectacles 400. In some embodiments, the electrical connection 410 may be located on a bottom side of a temple 404 of the spectacles 400. In some embodiments, the electrical connection 410 may be located at the component cavity 420.

The spectacles component cavity may comprise a battery, microcontroller, processor, memory, including non-transitory memory, and communication circuits, such as wired or wireless communication circuitry and one or more antennae for electronic communication. Although reference is made to a battery, the spectacle may comprise any suitable energy storage device.

The projection units 12 can be configured to provide defocused images to the peripheral portion of the retina as described herein and may include light sources and projection optics. In some embodiments, one or more projection optics are configured with the light sources to project a defocused image from the light sources onto the peripheral retina away from the central visual field that includes the macula in order to stimulate a change in choroidal thickness, such as an increase or decrease in cordial thickness. The one or more projection units can be configured to stimulate the retina without degrading central vision and corresponding images formed on one or more of the foveal or macular regions of the retina. In some embodiments, the one or more projection optics do not decrease the image forming characteristics of the vision correction optics prescribed to correct refractive errors of the wearers. This configuration can allow the wearer to have good visual acuity while receiving therapy from the defocused images as described herein.

In some embodiments, the light from light sources of the projection units is columnated and focused by one or more projection optics, as described herein. The function of the light sources and the projection optics is to substantially collimate the light emitted by the light sources and focus it at a focus that is designed to be in the front of or behind the retina to provide appropriate defocus to stimulate a change in choroidal thickness. For myopic defocus, the focused images may appear approximately 1.5 mm to 2.5 mm in front of the peripheral retina and myopic by about 2.0 D to 5.0 D, for example 2.0 D to 4.0 D, or preferably 2.5 D to 3.5 D, for example. For hyperopic defocus, the focused images may appear approximately 1.5 mm to 2.5 mm behind of the peripheral retina, in order to be hyperopic by about −2.0 D to 5.0 D, for example −2.0 D to −4.0 D, or preferably −2.5 D to −3.5 D, for example.

In accordance with some embodiments, a spectacle 400 comprises projection units which include projection optics and micro-displays as the light source. The micro-displays may comprise an OLED (organic light emitting diode) or an array of micro-LEDs. Light emitted by these displays may be Lambertian. In some embodiments, the micro-display is optically coupled to a micro-optical array that substantially collimates and focuses the light emanating from the micro-display. The micro-display may comprise one or more miniaturized pixels. In some embodiments, the micro-display forms an extended array of pixels, characterized by a pixel size and a pixel pitch, in which the pixel size and the pixel pitch together correspond to a fill factor of the micro-display. As described herein, each of the pixels may have a size within a range from about 2 microns to about 100 microns, and the pixel pitch may range from 10 microns to 1.0 mm, for example. The corresponding fill factor can range from 0.1% to 10%. In some embodiments, the pixel array is optically coupled with a micro-optic array in order to substantially collimate and focus light from the pixels.

The images created by these displays is defocused and may be placed symmetrically in four quadrants of the field of view or of the eye (e.g. nasal-inferior, nasal-superior, temporal-inferior and temporal-superior). The micro displays can be located away from the optical center of the lens. The central optic of the lens can be selected to bring the wearer to emmetropia. Each micro-display may be circular, rectangular or arcuate in shape and have an area within a range from 0.01 mm2 to 8.0 mm2, for example within a range from 0.04 mm2 to 8.0 mm2, for example within a range from 1 mm2 to 8 mm2, or preferably within a range from 1.0 mm2 to 4.0 mm2, in some embodiments.

The micro-display can be coupled to and supported with the body of the correction optic such as the spectacle lens, for example. In some embodiments, the micro-displays and the micro-optic arrays are mounted immediately adjacent to each other on the same correction optic, separated by a fixed distance in order to project a bundle of rays to the pupil of the eye, at an orientation such that it forms a defocused image at a desired location on the retina as described herein. In some embodiments, the one or more projection optics are mounted on or in the one or more correction optics, such that rays from the projection optics are refracted through the correction optics. The correction optics refract the rays from the projection optics to be convergent or divergent as helpful for clear vision, so that the micro-optical array can provide the desired magnitude of additional power that may be plus or minus, depending on the magnitude and sign of the defocus desired. The micro-display may be monochromatic or polychromatic, for example.

In some embodiments, the projected defocused image can be provided by a micro-display comprising a screen comprising one or more of an LCD screen, a screen driven by OLEDS (organic light emitting diodes), TOLEDS, AMOLEDS, PMOLEDS, or QLEDS. The screen may appear to the subject at a far distance of east least 6 meters or more, for example.

FIG. 5 shows a top view and a cross section of an electronic case with electronic spectacles placed inside. In the top view with the lid open, on the left side of FIG. 5, the spectacles have been placed in the base cavity of the case 100. The spectacle retention device 123c provide a shelf on which the left end piece and the left temple of the spectacles 400 may rest. Similarly, the spectacle retention device 123a provides a shelf on which on which the right end piece and the right temple of the spectacles 400 may rest.

The spectacle retention device 123b may include a protrusion, as discussed elsewhere herein. The protrusion may extend between the folded right temple, the end piece, and the lens frame of the spectacles 400. The protrusion may limit movement of the spectacles 400 within the case 100 by engaging with the folded right temple, the end piece, and the lens frame of the spectacles 400. For example, when forces on the case or spectacles may otherwise cause the spectacles to shift backward or forward within the case (up and down, respectively, in FIG. 5) the lens frame or temples of the spectacles may contact the protrusion which may limit further movement of the spectacles. Similarly, lateral movement (left and right in FIG. 5) may be limited by the sidewall of the insert and the protrusion of the spectacle retention device 123b.

As shown in the cross-section on the right side of FIG. 5, the protrusion of the spectacle retention device 123b, the shelf of the spectacle retention device 123a, and the sidewall 503 of the insert 120 may form a well or channel 502 that receives and retains the end piece of the spectacles 400.

The lens frames of the spectacles 400 may sit in the channel formed between the protrusion 126 and the sidewall 127. Similarly, the temple tips may rest on the bottom of the cavity in channels formed between the protrusion 126 and the left and right sidewalls of the insert 120.

The electrical connector 124 may be configured at a location within the cavity such that when the spectacles 400 are placed within a cavity and engaged by the protrusion of the spectacle retention device 123b, the connector 410 on the spectacles 400 may be located proximate to the position of the electrical connector 124. Magnets within the electrical connection 410 and the electrical connector 124 may be arranged with a polarity such that when the spectacles are placed in the case 100, the magnets pull the connector 410 of the frame together with the connector 124 of the base to complete the connection between the spectacles and the electoral components of the case. When the spectacles are connected to the case the spectacles may be charged and programmed by the case and the case may read information from the spectacles.

Figure 6:
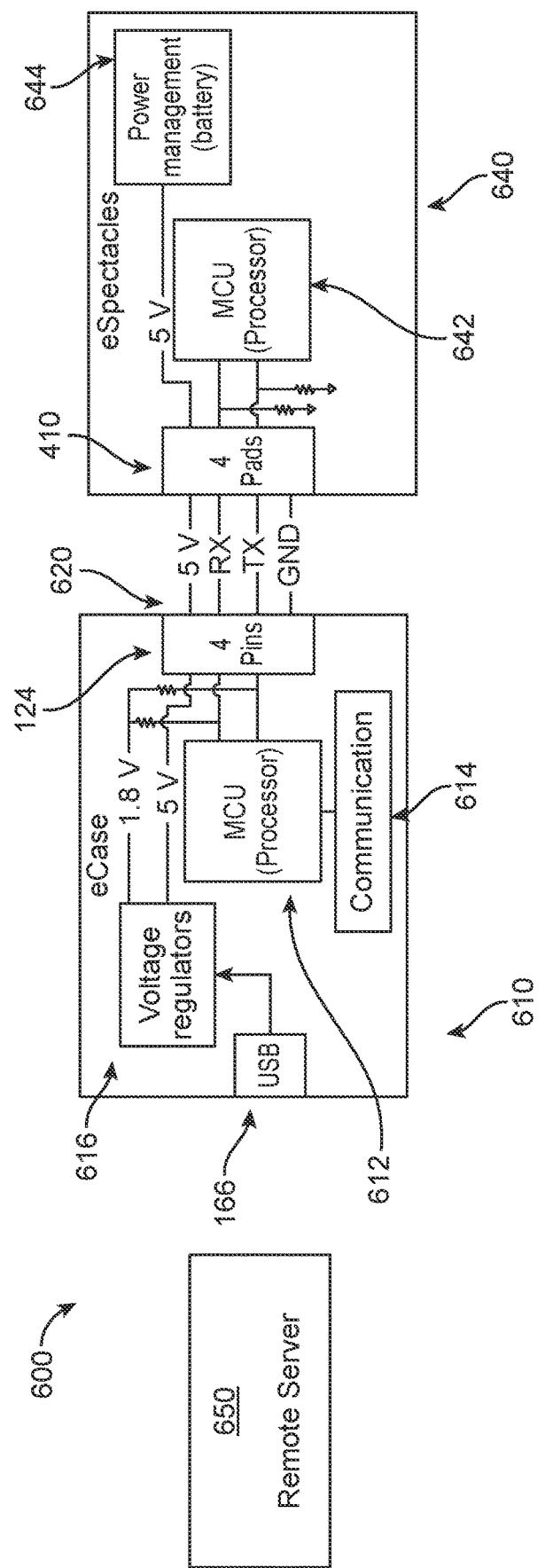
FIG. 6 shows a system diagram of an electronic case and electronic spectacles, in accordance with some embodiments.

FIG. 6 shows a system diagram of an electronic case and electronic spectacles. In some embodiments, the system 600 may include a case electronic system 610 and a spectacle electronic system 640. In some embodiments, the system 600 may include a remote server 650. The case electronic system 610 and the spectacle electronic system 640 may be releasably coupled together in electronic communication via the electrical connection 124 of the case electronic system 610 and the electrical connection 410 of the spectacle electronic system 640. The electrical connections 124, 410 may include four-pin electrical connectors for the transfer of power and for communication between the case electronic system 610 and the spectacle electronic system 640. A first of the four pins may be a power connection between the case electronic system 410 and the spectacle electronic system 640. The first pin may be a 5v pin configured to carry electrical current from the case electronic system 610 to the spectacle electronic system 640 in order to charge the energy storage device, such as a battery, of the power management system 644 of the spectacle electronic system.

A second and a third of the four pins may be used for electronic communication between the case electronic system 610 and the spectacle electronic system 640. Although labeled FIG. 6 as having one pin for transmission and one pin for receiving data, the bidirectional nature of the communication between the spectacle electronic system 640 and the case electronic system 610 means that the receive pin on the case electronic system 610 is coupled to the transmit pin on the spectacle electronic system 640 and the transmit pin on the case electronic system 610 is coupled to the receive pin on the spectacle electronic system 640. In some embodiments, the role of the transmit and receive pins may vary based on which device initiates communication between the devices. A fourth pin of the four pins may be used as a ground connection. The ground connection may provide a common reference voltage between the spectacle electronic system 640 and the case electronic system 610 in order to facilitate electronic communication and energy transfer between the case electronic system 610 in a spectacle electronic system 640.

The power management system 616 of the case electronic system 610 controls and manages the electrical power for the case electronic system 610. The power management system 616 may include an energy storage device, such as energy storage device 168, which may be a battery. External power for the case electronic system 610 may be received via an electrical connection 166, which may be a USB connection. In some embodiments, external power may be provided by an induction charging system connected to and part of the power management system 616. The power management system 616 may include voltage regulators and other components for altering and conditioning the external power for use in the system 600. For example, in some embodiments, the power management system 616 may use the external power to charge the internal batteries of the case electronic system 610.

In some embodiments, the power management system may include an antenna for wireless power transfer from an external transmitter to the case electronic system. Preferably the antenna wirelessly received electric power at a voltage that is in the range of about 1.1 volts to about 1.8 volts. In some embodiments, wireless power transfer may be transferred with an induction charging system, a near field wireless coupling, or an intermediate field weakly resonance coupled network. In some embodiments, wirelessly transmitted power is processed, for example, by ramped up in voltage by one of the microcontrollers before being gated into a recharging circuit, which may be part of the power management system, leading to recharging of the internal power source.

In some embodiments, the power management system 616 may receive power from an external power source or an internal energy storage device and output power to the components of the case electronic system 610 and the spectacle electronic system 640. In some embodiments, the power management system 616 provides power to the first of the four pins of the four-pin connector in order to transmit power to the spectacle electronic system. The power management system 616 may provide electrical power at many voltages, such as 5 V for charging batteries and 1.8 V for powering electronics such as the microcontroller 612 and communication system 614.

The case electronic system 610 may also include a microcontroller 612. In some embodiments, the microcontroller contains one or more CPUs, or processor cores, along with non-transitory memory for storing instructions to carry out any processes or methods discussed herein, and programmable input/output peripherals, such as a communications system and other peripherals. In some embodiments, the microcontroller 612 may be a system on a chip and may include one or more CPUs, or processor cores, memory, input/output ports and secondary storage, and other components such as radio modems or other devices on one or more substrates or microchips.

The microcontroller 612 may also be coupled in electronic communication to the one or more programming switches 312 and programming buttons 316. The microcontroller 612 may read the pressing of the programming buttons 316 and then read the status of the programming switches. Microcontroller 612 may then convert the programming switch statuses to stimulation commands or a stimulation configuration and send the stimulation commands or configuration to the spectacles through the electronic connection 124.

When the spectacles are placed in the case and coupled to the electronic system 610, the microcontroller 612 may receive usage information, such as the duration of stimulation provided by the spectacles, battery status information, or other information from the spectacles. In some embodiments, the microcontroller 612 may use the received information to activate the indicators, such as the energy storage device and compliance indicators on the case.

In some embodiments, the microcontroller 612 may store usage information in its memory for a period of time, such as at least one week, one month, six months, or a year. In some embodiments, the usage information may be converted to compliance data, such as a percentage of prescribed stimulation received by the patient, prior to storage.

In some embodiments, the case electronic system 610 may communicate with a remote server 650. The remote server may be any remote computing device, such as a cloud-based storage system, a backend server, a handheld device such as a smart phone, or a medical practitioner computing device. In some embodiments, the case electronic system 610 receives programming information from the remote server and may provide compliance or usage data to the remote server.

The spectacles 400 may include a spectacle electronic system 640. The spectacle electronic system 640 may include a power management system 644. The power management system 644 of the spectacle electronic system 640 controls and manages the electrical power for the spectacles 400. The power management system 644 may include an energy storage device, which may be a battery, capacitor, or other energy storage device. External power for the power management system 644 may be received via an electrical connection in the electrical connector 410. In some embodiments, external power may be provided by an induction charging system connected to or part of the power management system 644. The power management system 644 may include voltage regulators and other components for altering and conditioning power for use in the spectacles election system 640.

In some embodiments, the power management system 644 may receive power from an internal energy storage device and output power to the components of the spectacle electronic system 640, such as the light sources used for stimulating the patient's eyes. In some embodiments, the power management system 644 receives power from the first of the four pins of the four-pin connector and uses the power to charge an energy storage device within the spectacles 400.

The spectacle electronic system 640 may also include a microcontroller 642. In some embodiments, the microcontroller contains one or more CPUs, or processor cores, along with non-transitory memory for storing instructions that are carried out any other processes or methods discussed herein, and programmable input/output peripherals, such as communications interface and other peripherals. In some embodiments, the microcontroller 642 may be a system on a chip and may include one or more CPUs, or processor cores, memory, input/output ports and secondary storage, and other components such as radio modems or other devices on one or more substrates or microchips.

The microcontroller 642 may also be coupled in electronic communication to the case electronic system 610 and may receive patient stimulation commands or configurations from the case electronic system 610 through the electrical connection 410. After receiving the stimulation commands or configurations, the microcontroller 642 may configure the spectacles to provide the requested stimulation. In some embodiments, the microcontroller also controls the stimulation provided by the light sources in the spectacle lenses. For example, the microcontroller may command the LEDs to turn on and off, adjust the brightness, and the form other functions. The microcontroller 642 may also monitor the stimulation provided by the spectacles 400 and store the duration an amount of stimulation provided. When connected to the case electronic system 610, the microcontroller 642 may transmit the stored information to the case electronic system 610.

In some embodiments, the electronic system 610 of the electronic case 100 has internet connectivity, via Bluetooth transmitter, a WiFi network, or other means. In some embodiments, the same wireless transmitter, which may be part of the communication system or the microcontroller, may be used for wireless recharging and data transmission. In some embodiments, the wireless recharging power transfer and data transition for communication may use the same radio frequency. Preferably the transfer frequency is selected to be body safe, so that the transmitted or received power levels stay within safety limits of wireless power transfer. In some embodiments, a relatively low frequency, such as 25 KHz, useful mainly for inductive wireless energy transfer is used. In some embodiments, the charging or communication may occur via a sub gigahertz frequency, such as between about 700 MHz and about 800 MHz. Since the data to be transmitted by or to the electronic case is of relatively low volume, a narrow bandwidth, low power network is preferred for this application. Preferably, the electronic case transmits data to a portable device such as cellular device, including a cellular phone, which then transmits the use data to a cloud-based server. Use data may include data on daily compliance, charging status of the case and/or the spectacles, and data on operational status of the electronic case as well as the spectacles.

Figure 7:
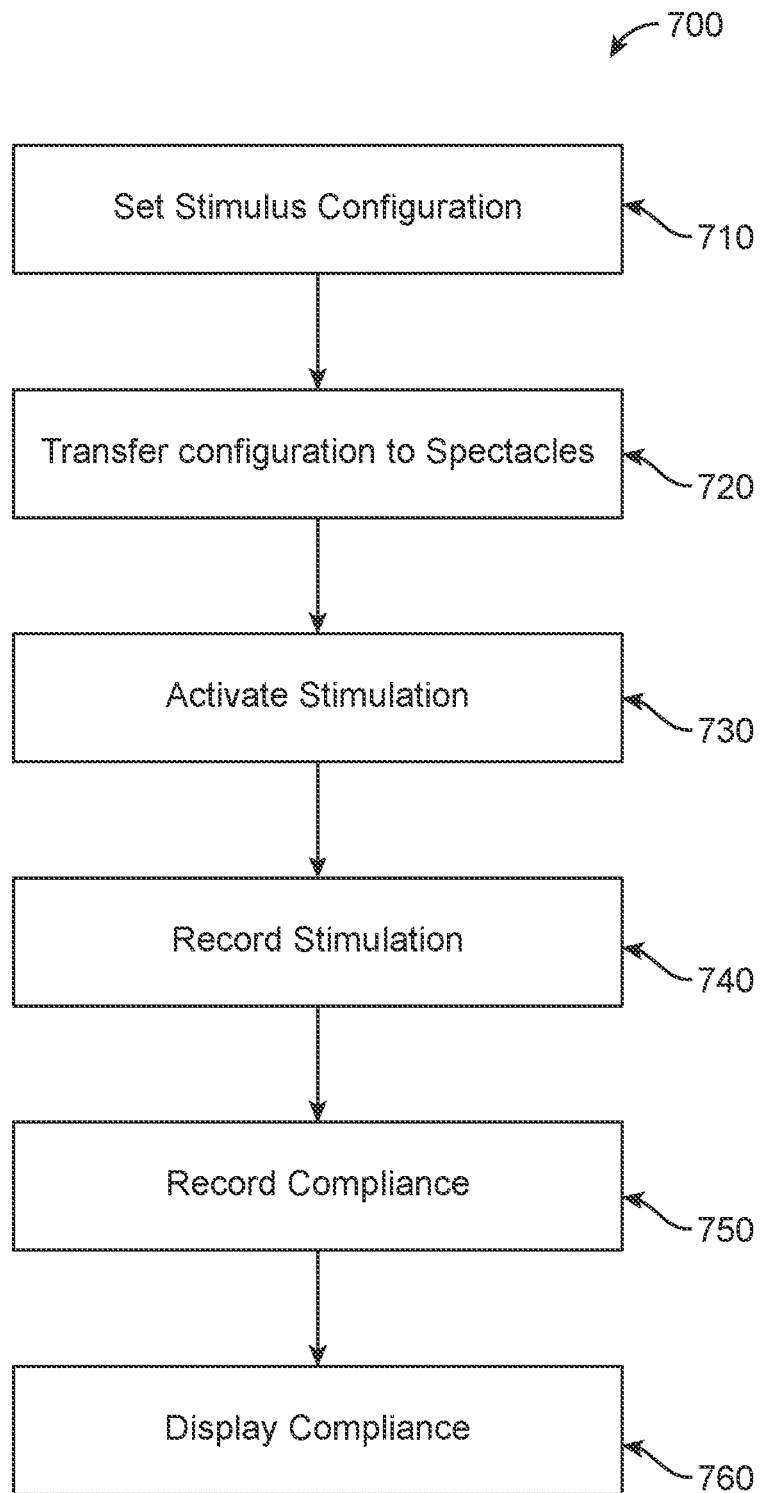
FIG. 7 shows a method of using the electronic case, in accordance with some embodiments.
Figure 8:
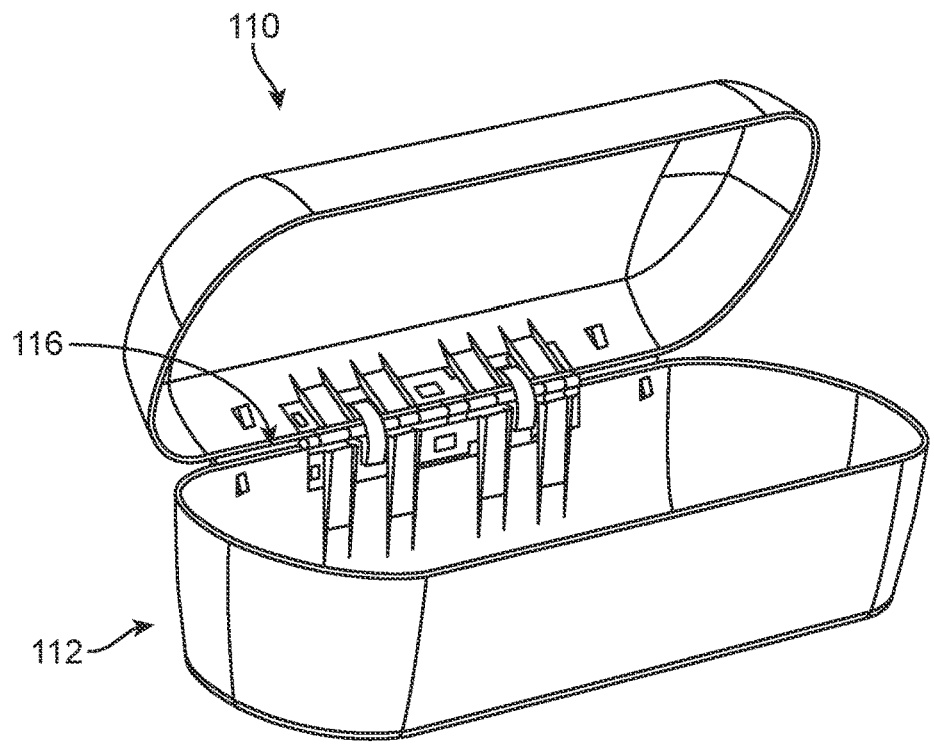

FIG. 7 shows a method 700 of using the electronic case. The method 700 may start at block 710 wherein the stimulation settings for the spectacles are configured. In some embodiments, the stimulation settings may be configured via a user interface on the spectacle case, such as with the one or more switches discussed herein. The switches may be manipulated by a user to program the stimulation provided by the spectacles 400. In some embodiments, the switches may be binary switches wherein they are either on or off, set to 1 or 0, respectively. In some embodiments, a first set of switches may be manipulated by a user to program which eye or eyes are stimulated during treatment. In some embodiments, the user may choose between one of four settings to stimulate nowise, to stimulate the left eye, to stimulate the right eye, or to stimulate both eyes.

In some embodiments, a second set of switches may be used to program the recommended or prescribed duration of treatment. In some embodiments, each switch may be used to indicate the duration of treatment. In some embodiments, only one switch may be in the on position for programming. In some embodiments, each switch may be used to indicate the duration of treatment and the sum of the durations may be added together to determine the total stimulus duration, as discussed herein.

In some embodiments, after manipulating the switches to the desired stimulation configuration, the user may initiate programming of the desired stimulation. For example, in some embodiments, the user may press a button on the case in order to initiate programming of the desired stimulation. In some embodiments, the case receives programming information from the remote server or a remote device such as a mobile device or medical professional's computer.

In some embodiments, the program information is stored in memory within the case 100. For example, the microcontroller within the base may cause the program information to be stored within the memory until a pair of spectacles 400 are placed in and coupled to the case 100.

At block 720, the stimulation settings are transferred to the spectacles. In some embodiments, the spectacles are placed or received into a cavity of the spectacle case 100 and the electronic connection 124 of the case is physically and electronically coupled to the electronic connection 410 of the spectacles 400. In some embodiments, electrical conductors, such as pins, in the electronic connection 124 of the case may contact corresponding electrical conductors, such as pads, located on the electronic connection 410 of the spectacles.

After connecting the spectacles to the case, the stimulation programming or settings may be transferred from the case to the spectacles. In some embodiments, spectacles may read information from the case and then program the stimulation provided by the spectacles based on the information from the case. In some embodiments, spectacles may be charged while connected to the case. For example, energy may be transferred from an energy storage device within the case, through the connectors 124, 410 and to an energy storage device within the spectacles.

After the stimulation settings have been transferred and/or the energy storage device within the spectacles has been charged, the spectacles may be removed from the case and used to treat the patient's eyes.

At block 730, the spectacles stimulate the patient's eyes. After the spectacles are programmed and the energy storage device within the spectacles charged, the patient wears the spectacles to stimulate their eyes. In some embodiments, the spectacles are placed on the patient's face and the microcontroller 644 of the spectacles initiates stimulation according to the program stimulation, as discussed herein. For example, the electronic spectacles 400 may project a defocused image on the retina away from the central field that includes the macula in order to stimulate a change in choroidal thickness. The microcontroller 644 of the spectacles may control one or more one or more light injectors, lenses, or mirrors for the projection of images onto the patient's retina, as described in more detail herein.

At block 740, the stimulation provided by the spectacles is recorded. In some embodiments, the spectacles record the duration of the stimulation provided to the patient's eye or eyes in internal memory of the microcontroller. In some embodiments, the spectacles may include a clock and/or a calendar for tracking compliance over a plurality of days, weeks, or months without connection to the case 100.

At block 750, the recorded stimulation is formatted, stored, and transmitted. In some embodiments, the data representing the recorded stimulation is formatted in a tabulated manner for each day, week, or month or other timeframe. In some embodiments, the stimulation data is formatted on the spectacles, while in some embodiments, the stimulation data is formatted in the case.

After a period of usage, the stimulation data is transferred to the case 100. The stimulation data may be transferred to the case via the electrical connection 410 and the electrical connection 124. The stimulation data may be stored in memory in the case. In some embodiments, the microcontroller of the case may use the simulation data and the programmed stimulation configuration to determine an amount of patient compliance. In some embodiments, the data may be transmitted wirelessly to a remote device such as a cloud-based database in order to store the information for later retrieval and analysis by a medical professional.

At block 760, compliance is displayed. In some embodiments, the compliance information may be displayed on a compliance indicator. For example, on a compliance indicator on the case 100. In some embodiments, the compliance indicator may include one or more sub indicators. The compliance indicator or the sub indicators may include a light guide positioned on the rim of the case and a light source, such as an LED, associated with each of the light guides. In the example shown in FIG. 1, the compliance indicator 144 includes four sub indicators. Each sub indicator may represent a relative amount of a patient's compliance with the prescribed or programmed stimulation. For example, with four indicators each indicator may represent compliance with one quarter of the prescribed or programmed stimulation such that one illuminated indicator represents a compliance of at least 25% or between 25% and less than 50% compliance. When two indicators are illuminated, the patient may have between 50% and less than 75% compliance with the prescribed or programmed stimulation. When three indicators are illuminated, the patient may have between 75% and less than 100% compliance with the prescribed or programmed stimulation. When four indicators are illuminated, the patient may have complied with greater than 99%, such as 100%, of the prescribed or programmed stimulation. In some embodiments, the compliance indicator may include one or more displays to display the compliance data in numerical format, for example such as with one or more seven segment displays, LED, OLED, or LCD displays.

The case 100 may be assembled in many ways. FIGS. 8, 9, 10, 11, 12, and 13 shows steps of an embodiment of a method of assembling an electronic case. At FIG. 8, the case lid 110 is coupled to the case base 112 via a hinge 116. The case lid and the case base may be made from injection molded polymer, directly fabricated polymers, machined metal or polymer, or other material. The hinge may engage with the case lid 110 in case base 112 and, once engaged resist removal therefrom.

Figure 9:
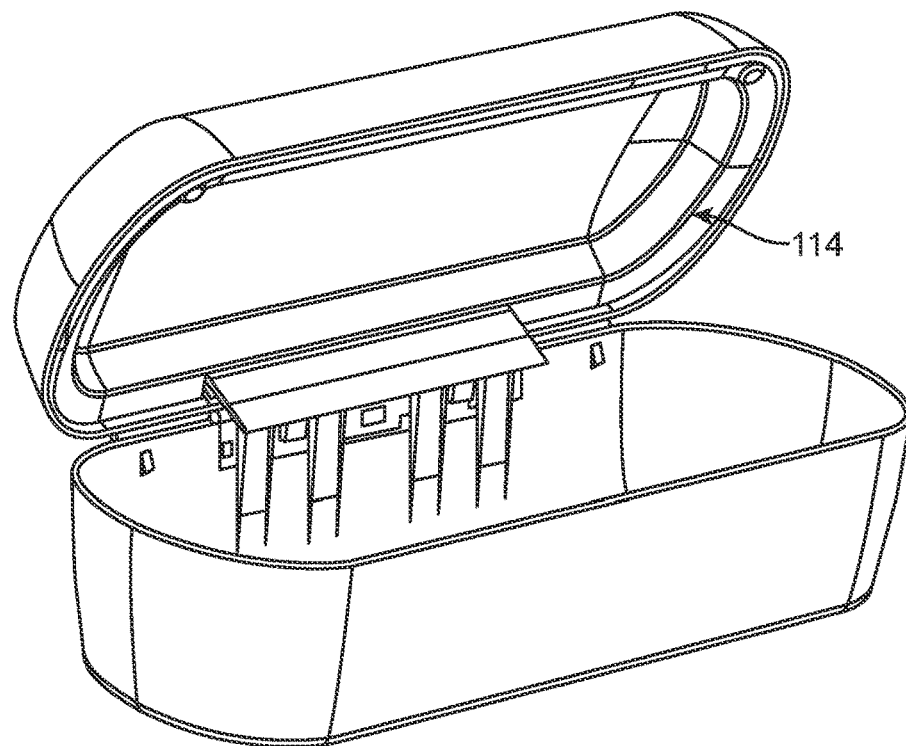

At FIG. 9 the lid insert 114 is coupled to the case lid 112. In some embodiments, the lid insert is adhered to the case lid 110. In some embodiments, the lid insert snaps into the case lid or other mechanical couplings are used to couple the case lid to the lid insert.

Figure 10:
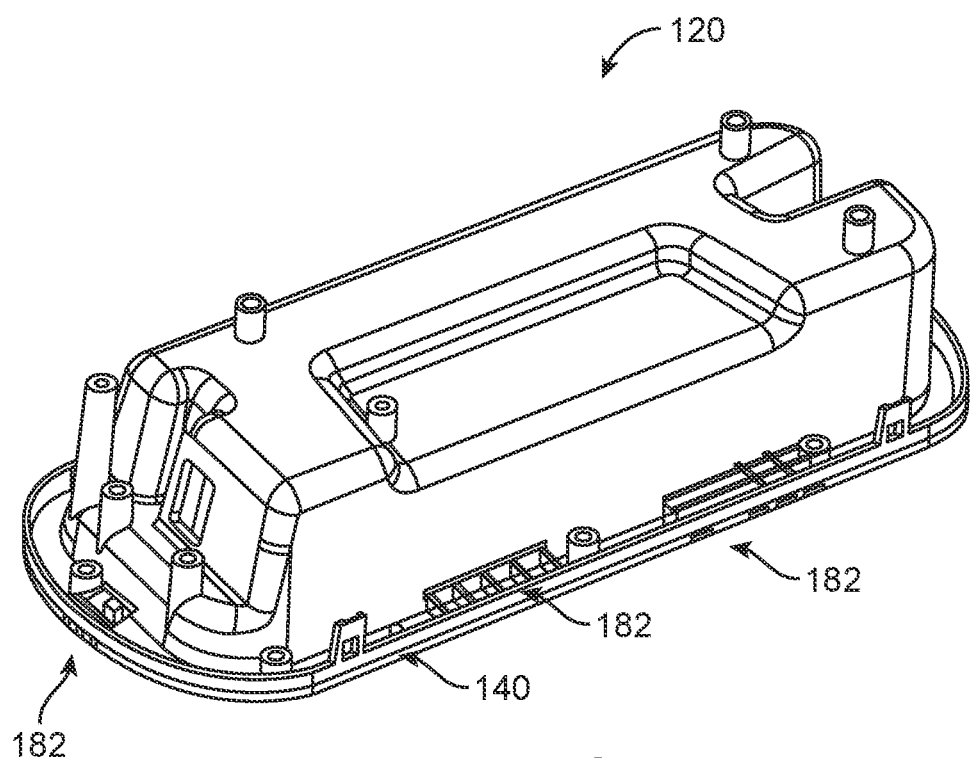

At FIG. 10 the user interface of the case is assembled into the base insert 120. The case lid and the case base may be made from injection molded polymer, directly fabricated polymers, machined metal or polymer, or other material. The user interface structures, such as the light guides 182 and the compliance button 140 may be coupled to the base insert 120. In some embodiments, the user interface structures may be inserted into the rim of the base insert.

Figure 11:
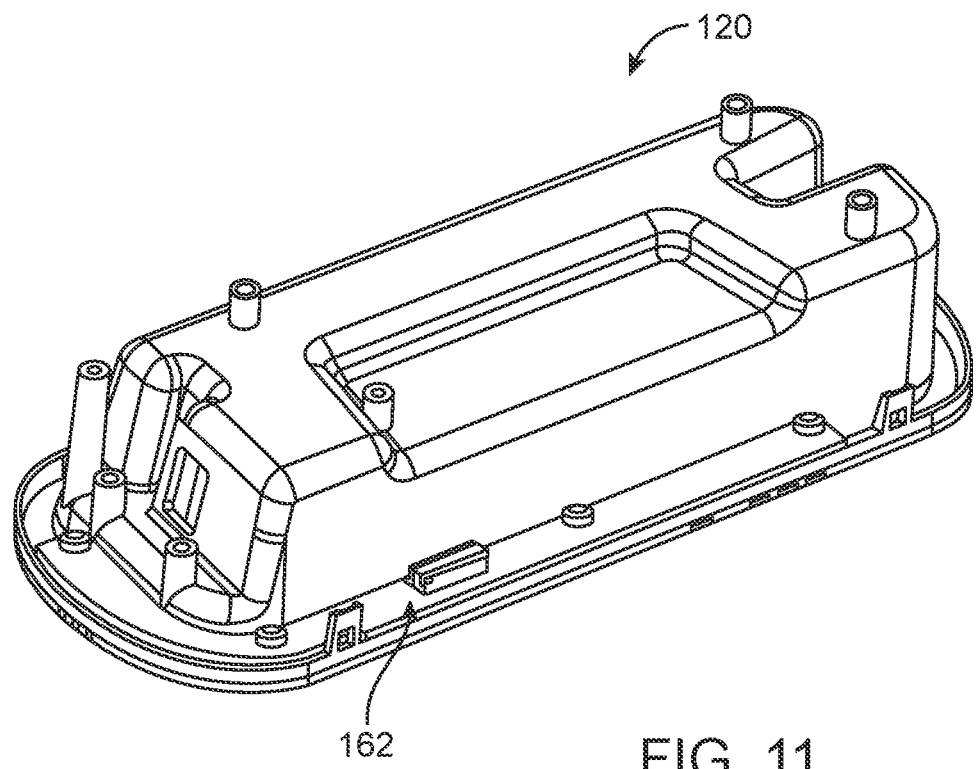

At FIG. 11, the interface logic board 162 is assembled and attached to the base insert 120. Assembling the logic board may include soldering LEDs connectors, and other components onto the interface logic board. In some embodiments, the interface logic board 162 may be secured to the rim of the base insert with one or more screws, such as machine screws or self-tapping screws. In some embodiments, the interface logic board may be secured to the base insert with an adhesive, an epoxy, or other bonding material.

Figure 12:
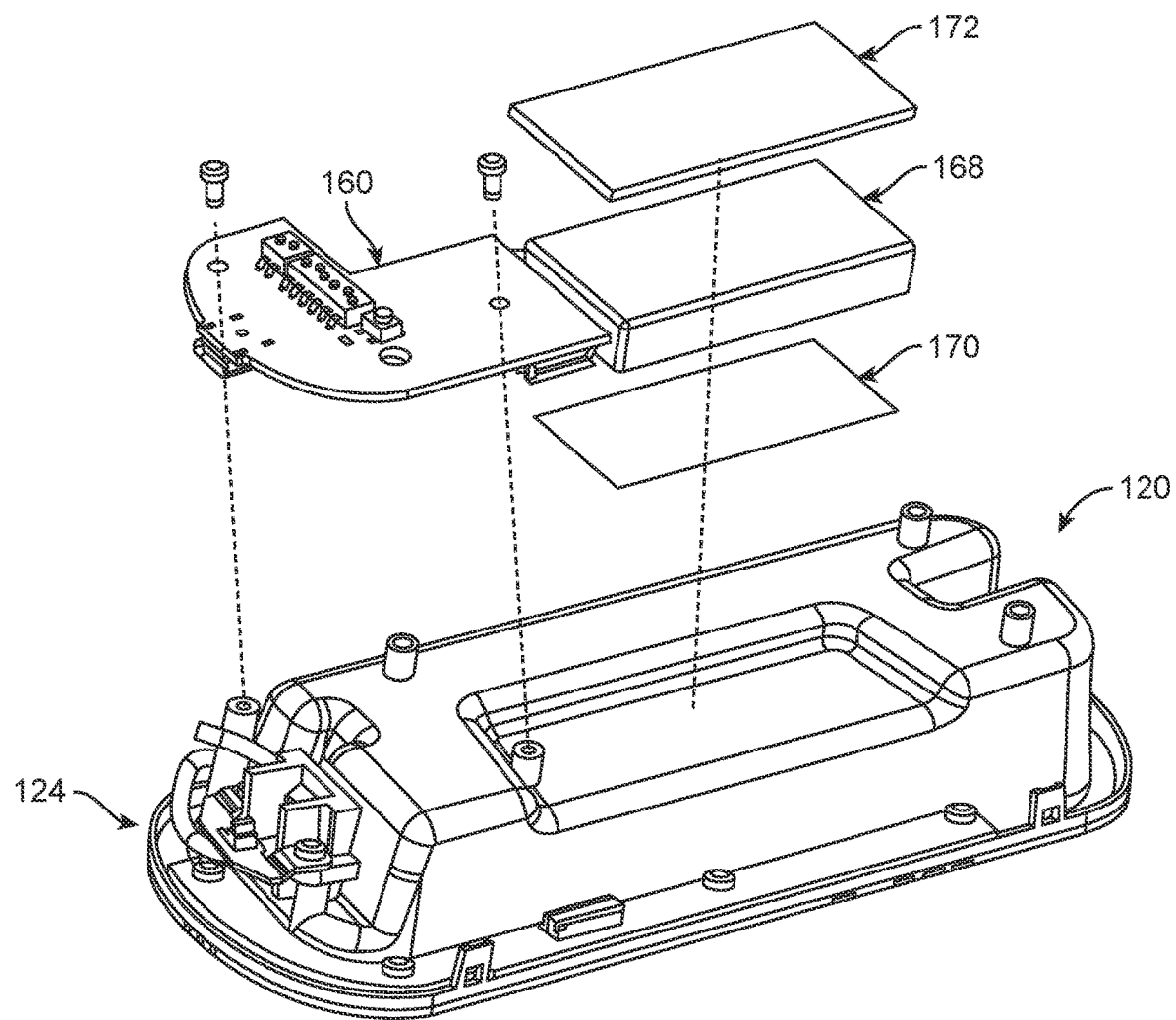

At FIG. 12, the main logic board 160, energy storage device 168, and electronic connection 124 are assembled and attached to the base insert 120. Assembling the electronic connection 124 may include passing the connector through an aperture in the base insert so that a first end of the connector that interfaces with the spectacles 400 may be placed within the cavity of the base insert. In some embodiments, a strain relief may be formed with a second end of the electronic connector 124 during assembly.

In some embodiments, the logic board 160 assembling the main logic board may include soldering LEDs, connectors, processors, memory, communication devices, and other components onto the interface logic board. In some embodiments, the energy storage device 168 may be mechanically and electrically coupled to the logic board 160 prior to assembling the logic board 160 and the energy storage device 168 with the base insert 120. In some embodiments, the energy storage device 168 is electrically coupled to the logic board 160 after assembly with the base insert 120. In some embodiments, the energy storage device 168 is adhered to the base insert 120 with an adhesive such as double-sided tape epoxy glue or other material. In some embodiments, a second adhesive 172 may be placed on an underside of the energy storage device 168. The second adhesive may provide shock or impact dampening and may be made of a foam or polymer material such as an open cell foam strip.

In some embodiments, the main logic board 160 may be secured to the base insert with one or more screws, such as machine screws or self-tapping screws. In some embodiments, the May logic board 160 logic board may be secured to the base insert with an adhesive, an epoxy, or other bonding material.

At FIG. 13, the base insert 120 is inserted into the case base 112. In some embodiments, the base insert is adhered to the case base 112. In some embodiments, the base insert snaps into the case base or other mechanical couplings are used to couple the case base to the base insert. In some embodiments, a living hinge portion 116 of the lid insert 114 may be coupled to the base insert 120. In some embodiments, a portion of a living hinge portion 116 may be inserted between the base insert and the case base 112.

In some embodiments, after assembly, the case 100 may undergo quality control testing and once passed may be used with the spectacles 400 as described herein.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor. The processor may comprise a distributed processor system, e.g.

running parallel processors, or a remote processor such as a server, and combinations thereof.

Although illustrated as separate elements, the method steps described and/or illustrated herein may represent portions of a single application. In addition, in some embodiments, one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. An electronic case for electronic spectacles comprising: a base comprising a cavity formed therein; a first spectacle retention device within the cavity that is configured to retain spectacles; an electrical control system; and an electrical connector configured to operatively couple the electrical control system to the electronic spectacles.

Clause 2. The electronic case of clause 1, wherein the first spectacle retention device comprises a shelf configured to receive an end piece of the spectacles.

Clause 3. The electronic case of clause 2, wherein the first spectacle retention device further comprises a protrusion that extends from the shelf.

Clause 4. The electronic case of clause 3, wherein the protrusion, the shelf, and a first sidewall of the cavity forms a well for receiving the end piece of the spectacles.

Clause 5. The electronic case of clause 4, further comprising: a second spectacle retention device within the cavity that is configured to retain spectacles.

Clause 6. The electronic case of clause 5, wherein the second spectacle retention device extends from a second side wall of the cavity, the second sidewall being opposite a first sidewall.

Clause 7. The electronic case of clause 1, wherein the shelf is located at a distance from a floor of the cavity that is equivalent to a distance from a bottom of the end piece of the spectacles to a bottom of a lens frame of the spectacles.

Clause 8. The electronic case of clause 4, wherein the well has a width between the protrusion and a first side of the cavity that is greater than the width of an end piece of the spectacles.

Clause 9. The electronic case of clause 8, wherein the width is less than twice the width of an end piece of the spectacles.

Clause 10. The electronic case of clause 1, wherein the electrical control system further comprises an energy storage device.

Clause 11. The electronic case of clause 10, wherein the energy storage device is located beneath a protrusion and the bottom of the cavity.

Clause 12. The electronic case of clause 10, wherein the energy storage device is configured to be coupled to the spectacles via the electrical connector.

Clause 13. The electronic case of clause 12, wherein the electrical control system of the case is configured to provide energy from energy storage device of the case to the spectacles.

Clause 14. The electronic case of clause 1, further comprising a plurality of indicators.

Clause 15. The electronic case of clause 14, wherein a first of the plurality of indicators is a case energy storage status indicator.

Clause 16. The electronic case of clause 15, wherein the electrical control system is configured to illuminate the case energy storage status indicator based on the energy stored within the case energy storage device.

Clause 17. The electronic case of clause 15, wherein a second of the plurality of indicators is a spectacle energy storage status indicator.

Clause 18. The electronic case of clause 17, wherein the electrical control system is configured to illuminate the spectacle energy storage status indicator based on the energy stored within the spectacle energy storage device.

Clause 19. The electronic case of clause 18, wherein the electrical control system comprises a plurality of light sources, each associated with one of the plurality of indicators.

Clause 20. The electronic case of clause 19, further comprising a lid, wherein the plurality of indicators is only partially occluded by the lid when the lid is closed on the base.

Clause 21. The electronic case of clause 19, wherein the lid is coupled to the base with a hinge.

Clause 22. The electronic case of clause 14, wherein one of the plurality of indicators is a patient compliance indicator.

Clause 23. The electronic case of clause 10, further comprising a wireless charging system, the wireless charging system configured to transfer power from a source external to the case to the energy storage device.

Clause 24. The electronic case of clause 22, wherein the electrical control system is configured to receive spectacle usage data from the spectacles via electrical connector.

Clause 25. The electronic case of clause 24, wherein the electrical control system further comprises a programming interface for receiving spectacle stimulation configuration data.

Clause 26. The electronic case of clause 25, wherein the electrical control system is configured to transmit the spectacles stimulation configuration data to the spectacles to configure the spectacles for stimulating a patient eyes.

Clause 27. The electronic case of clause 26, wherein the electrical control system is configured to determine patient compliance based on spectacle usage data and spectacles stimulation configuration data.

Clause 28. The electronic case of clause 27, wherein the electrical control system is configured to illuminate the compliance indicator based on the determined patient compliance.

Clause 29. The electronic case of clause 24, wherein the electrical control system further comprises a communication system for wireless communication a remote device.

Clause 30. The electronic case of clause 29, wherein the electrical control system further is configured to wirelessly transmit or receive a compliance data, energy storage status data, or operational data of the case or spectacles.

Clause 31. The electronic case of any one of clauses 1 to 30, further comprising a case insert, wherein the indicators are in the case insert.

Clause 32. The electronic case of clause 31, wherein the case insert further comprises a rim, and wherein the indicators are located in the rim.

Clause 33. An electronic case for electronic spectacles comprising: a processor; and a non-transitory computer readable medium configured with instructions that when executed by the processor cause the processor to perform operations comprising: receiving spectacle stimulation configuration data; transmitting the spectacle stimulation configuration data to the electronic spectacles; receiving patient stimulation data from the electronic spectacles; and indicating patient compliance based on the received patient stimulation data.

Clause 34. The electronic case of clause 33, wherein a patient eyes are stimulated with the electronic spectacles between the transmitting of the spectacle stimulation configuration data and the receiving of the patient stimulation data.

Clause 35. The electronic case of clause 33, wherein the spectacle stimulation configuration data is received via user input.

Clause 36. The electronic case of clause 35, where the user input is via a plurality of switches located within a body of the electronic case.

Clause 37. The electronic case of clause 33, wherein the patient stimulation data includes a duration of which stimulation was provided to the patient.

Clause 38. The electronic case of clause 37, wherein the spectacle stimulation configuration data includes a duration for which stimulation should be provided to the patient.

Clause 39. The electronic case of clause 38, wherein patient compliance is based on the received patient stimulation data and the spectacle stimulation configuration data.

Clause 40. The electronic case of clause 38, wherein the instructions that when executed by the processor cause the processor to perform operations further comprising: receiving user input; and resetting patient compliance data based on the user input.

Clause 41. The electronic case of clause 40, wherein the user input is a button press.

Clause 42. The electronic case of clause 38, further comprising: an energy storage device, and wherein the instructions that when executed by the processor cause the processor to perform operations further comprising: determining a charge status of the energy storage device.

Clause 43. The electronic case of clause 42, wherein the instructions that when executed by the processor cause the processor to perform operations further comprising: visually indicating the charge status of the energy storage device Clause 44. The electronic case of clause 39, wherein the instructions that when executed by the processor cause the processor to perform operations further comprising: wirelessly transmit the compliance data to a remote device.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. An electronic case for electronic spectacles comprising:
a base comprising a cavity formed therein;
a first spectacle retention device within the cavity that is configured to retain spectacles;
an electrical control system;
an inductive charging system configured to inductively charge the electronic spectacles;
a wireless communication system configured to operatively wirelessly couple the electrical control system to the electronic spectacles in electronic data communication; and a plurality of indicators, wherein one of the plurality of indicators is a compliance indicator that indicates a patient's compliance with wearing the spectacles.

2. The electronic case of claim 1, wherein the electrical control system is configured to receive spectacle usage data from the spectacles via the wireless communication system.

3. The electronic case of claim 2, wherein the electrical control system is configured to determine patient compliance based on spectacle usage data.

4. The electronic case of claim 3, wherein the electrical control system is configured to illuminate the compliance indicator based on the determined patient compliance.

5. The electronic case of claim 2, wherein the wireless communication system is configured to illuminate the compliance indicator based on the spectacle usage data.

6. The electronic case of claim 1, wherein the wireless communication system comprises communication circuitry and an antenna.

7. The electronic case of claim 1, wherein the wireless communication system is configured to wirelessly transmit or receive compliance data, energy storage status data, spectacle usage data, or operational data of the electronic case or spectacles.

8. The electronic case of claim 2, wherein the electrical control system further comprises a programming interface for receiving spectacle stimulation configuration data.

9. The electronic case of claim 8, wherein the electrical control system is configured to determine patient compliance based on spectacle usage data and the spectacle stimulation configuration data.

* * * * *